United States Patent [19]

Oshiga et al.

[11] Patent Number: 5,699,080
[45] Date of Patent: Dec. 16, 1997

[54] PROGRAMMING METHOD AND APPARATUS FOR PROGRAMMABLE CONTROLLER

[75] Inventors: Takayuki Oshiga, Narashino; Atsushi Itoh; Tsurumasa Matsushita, both of Funabashi; Tsutomu Sunaga, Narashino, all of Japan

[73] Assignee: Hitachi, Ltd., Tokyo, Japan

[21] Appl. No.: 110,191

[22] Filed: Aug. 9, 1993

Related U.S. Application Data

[63] Continuation of Ser. No. 762,367, Sep. 19, 1991, abandoned.

[30] Foreign Application Priority Data

Sep. 20, 1990 [JP] Japan .................. 2-248735
Nov. 26, 1990 [JP] Japan .................. 2-324885

[51] Int. Cl.$^6$ .................................................. G09G 5/08
[52] U.S. Cl. .................................. 345/157; 345/145
[58] Field of Search ................ 364/147; 395/133, 395/140, 141, 146, 147, 160, 161, 375, 339, 348, 349, 350, 352, 353, 650; 345/133, 145, 156, 157

[56] References Cited

U.S. PATENT DOCUMENTS

| | | | |
|---|---|---|---|
| 4,354,184 | 10/1982 | Woborschil | 340/709 |
| 4,445,169 | 4/1984 | Wakita et al. | 364/147 |
| 4,449,180 | 5/1984 | Oshima et al. | 395/141 |
| 4,468,755 | 8/1984 | Iida | 340/709 |
| 4,488,258 | 12/1984 | Struger et al. | 395/146 |
| 4,656,603 | 4/1987 | Dunn | 340/721 |
| 4,751,507 | 6/1988 | Hama et al. | 340/709 |
| 4,829,292 | 5/1989 | Tokuda | 340/709 |
| 4,831,580 | 5/1989 | Yamada | 395/133 |
| 4,835,526 | 5/1989 | Ishii et al. | 340/709 |
| 5,021,973 | 6/1991 | Hernandez et al. | 340/709 |

FOREIGN PATENT DOCUMENTS

| | | | |
|---|---|---|---|
| 0015891 | 1/1981 | Japan | 340/709 |
| 56-11502 | 2/1981 | Japan . | |
| 60-221807 | 11/1985 | Japan . | |
| 0111995 | 4/1990 | Japan | 340/709 |
| 0160287 | 6/1990 | Japan | 340/709 |
| 2077966 | 12/1981 | United Kingdom . | |

OTHER PUBLICATIONS

"Step® 5 Programming Package for Personal Computers", Simatic S5 Manual Volume 1/2, Siemens Aktiengesellschaft.
*Industrial Robotics: Technology, Programming, and Applications*, by M.P. Groover, et al., McGraw–Hill, Inc., 1986.

*Primary Examiner*—Xiao Wu
*Attorney, Agent, or Firm*—Antonelli, Terry, Stout, & Kraus, LLP

[57] ABSTRACT

In a sequence program constructed by forming a ladder diagram on a display screen, an element corresponding to a minimum unit of the ladder diagram is arranged by a symbol element and a character element. Inputting and amending operations of the ladder diagram are performed by a first cursor for designating each element and a second cursor for designating the character element of the element designated by this first cursor.

12 Claims, 29 Drawing Sheets

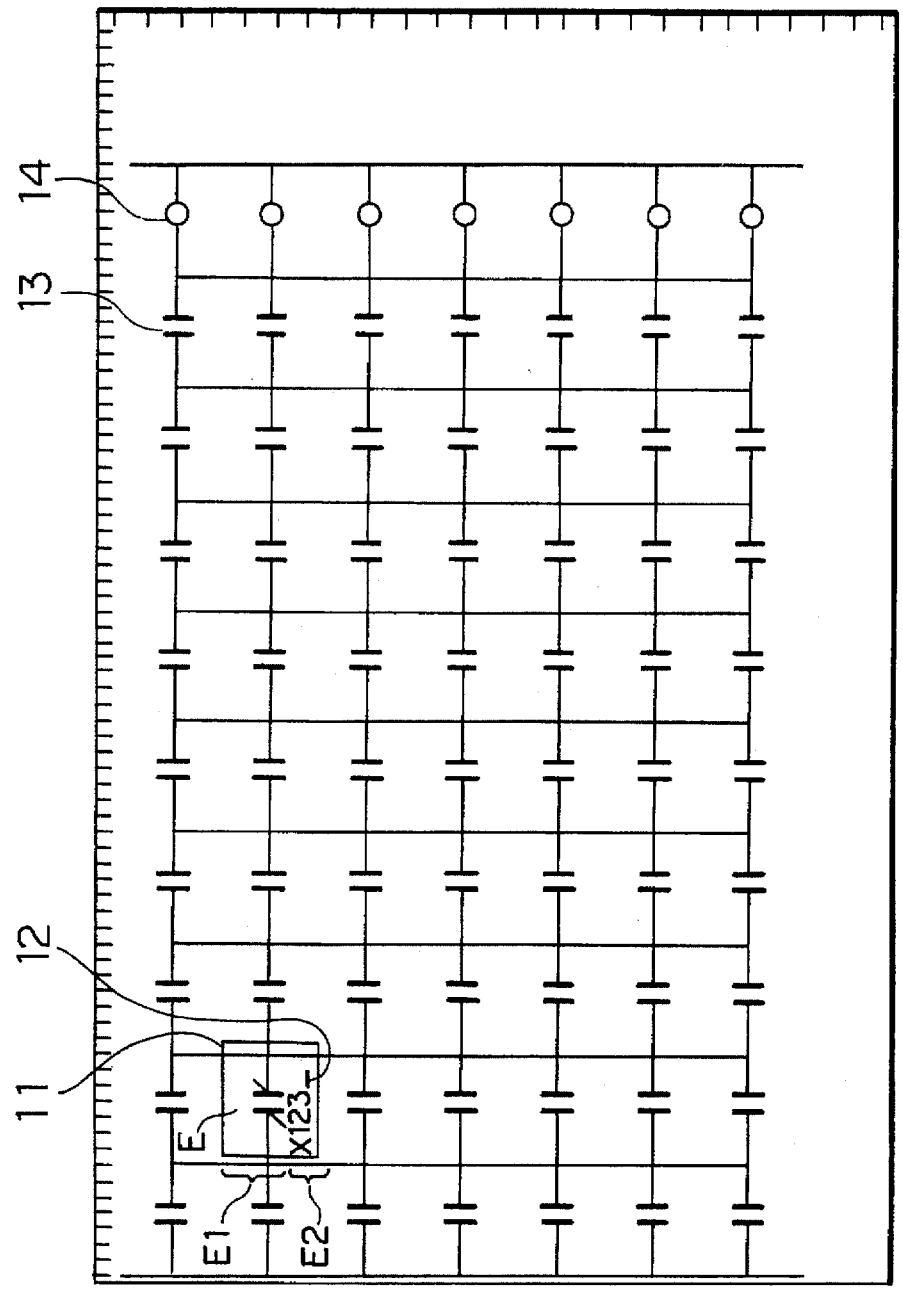

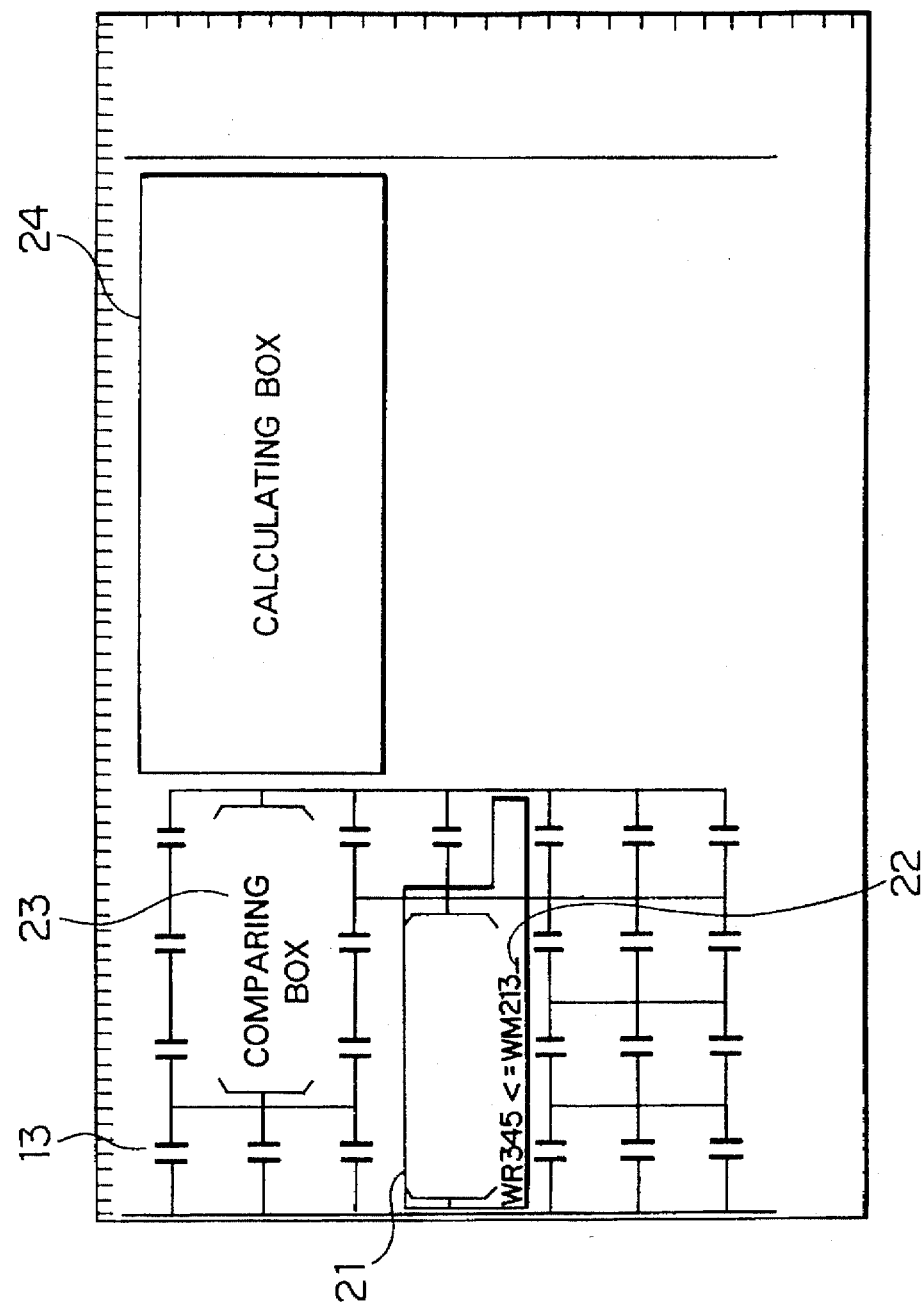

KEY OPERATION AT THE TIME OF CONTACT INPUTTING

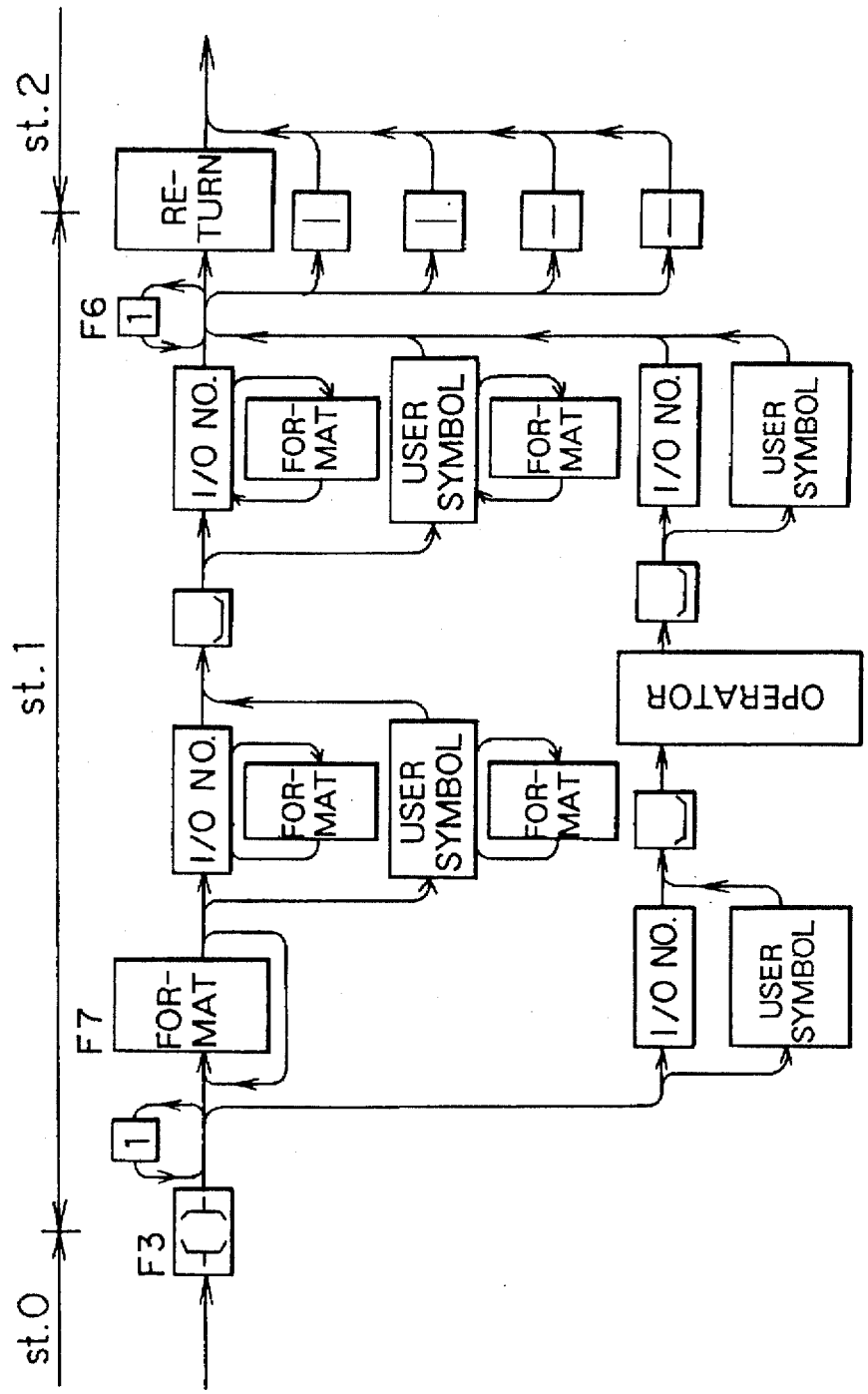

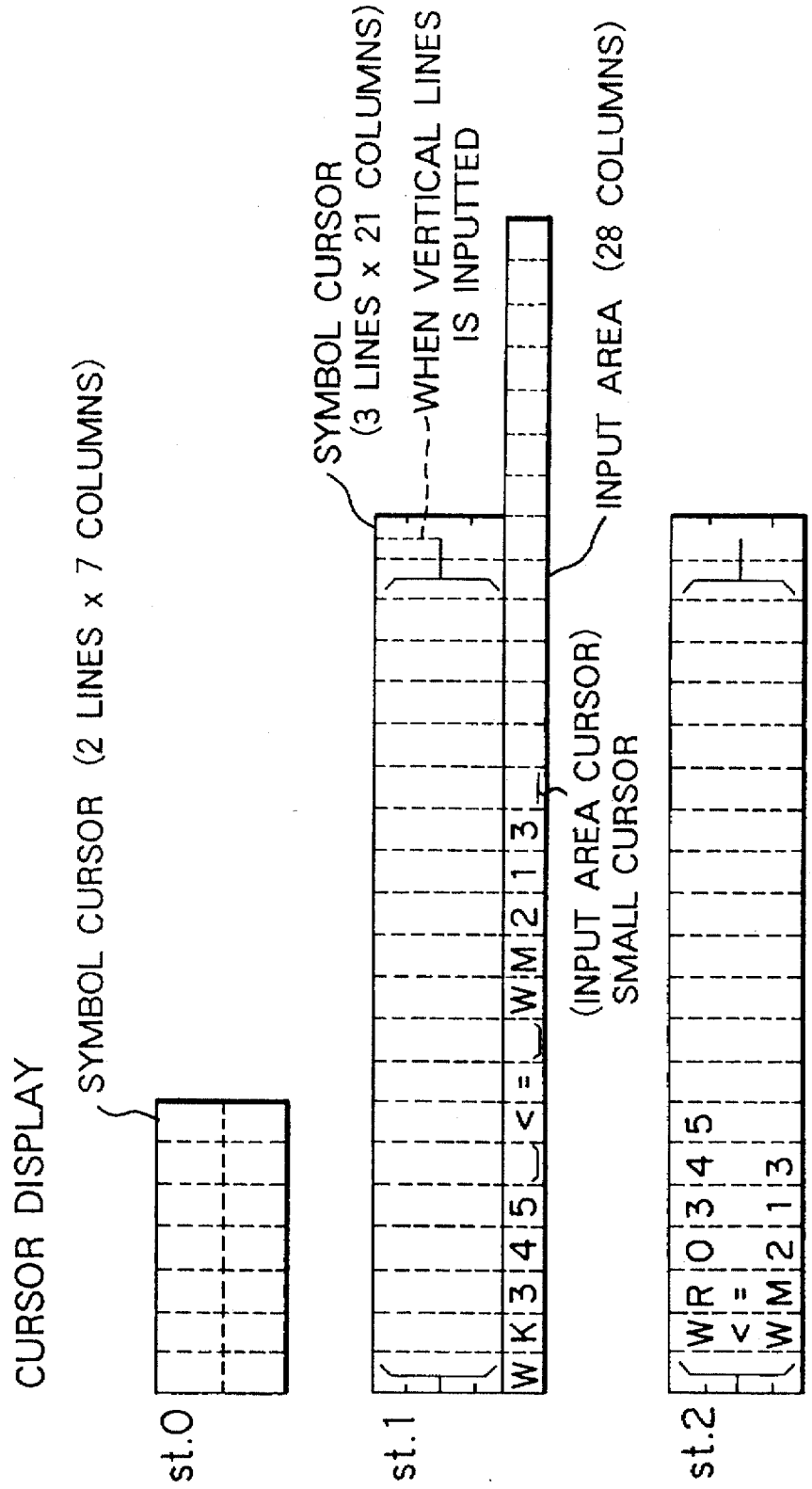

KEY OPERATIONS FOR INPUTS OF CALCULATING BOX

SCREEN DISPLAY

DETAILED CURSOR DISPLAY

SYMBOL/PARAMETER SIMULTANEOUS INPUT MODE

TO FIG.11B

SYMBOL INPUT MODE

TO FIG.11C

PARAMETER INPUT MODE

TO FIG.11A

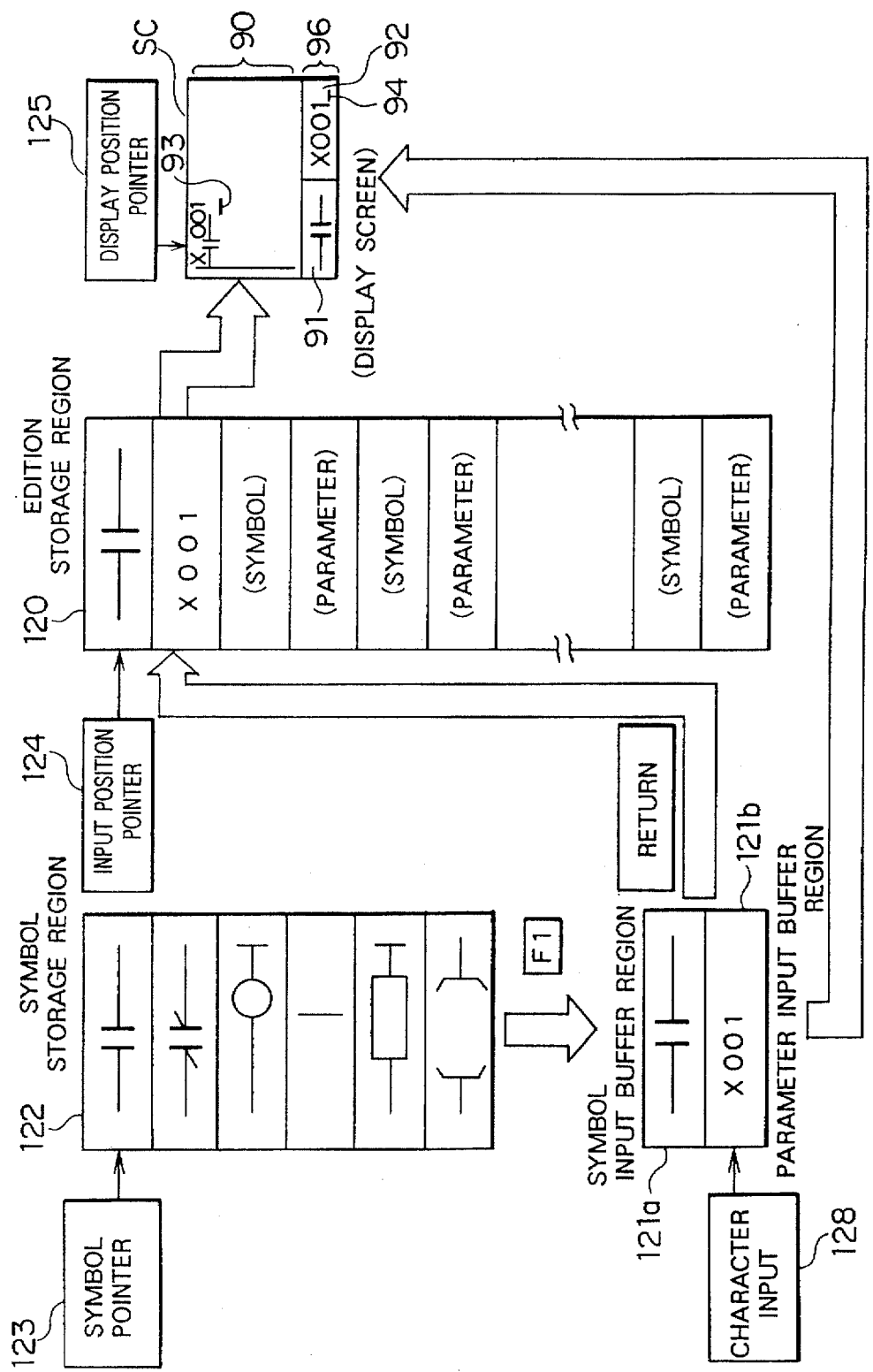

FLOW OF MAIN PROCESS

INPUT POSITION CURSOR MOVEMENT PROCESS FOR MODE 1

SYMBOL INPUT PROCESS
(MODE 1、MODE 2)

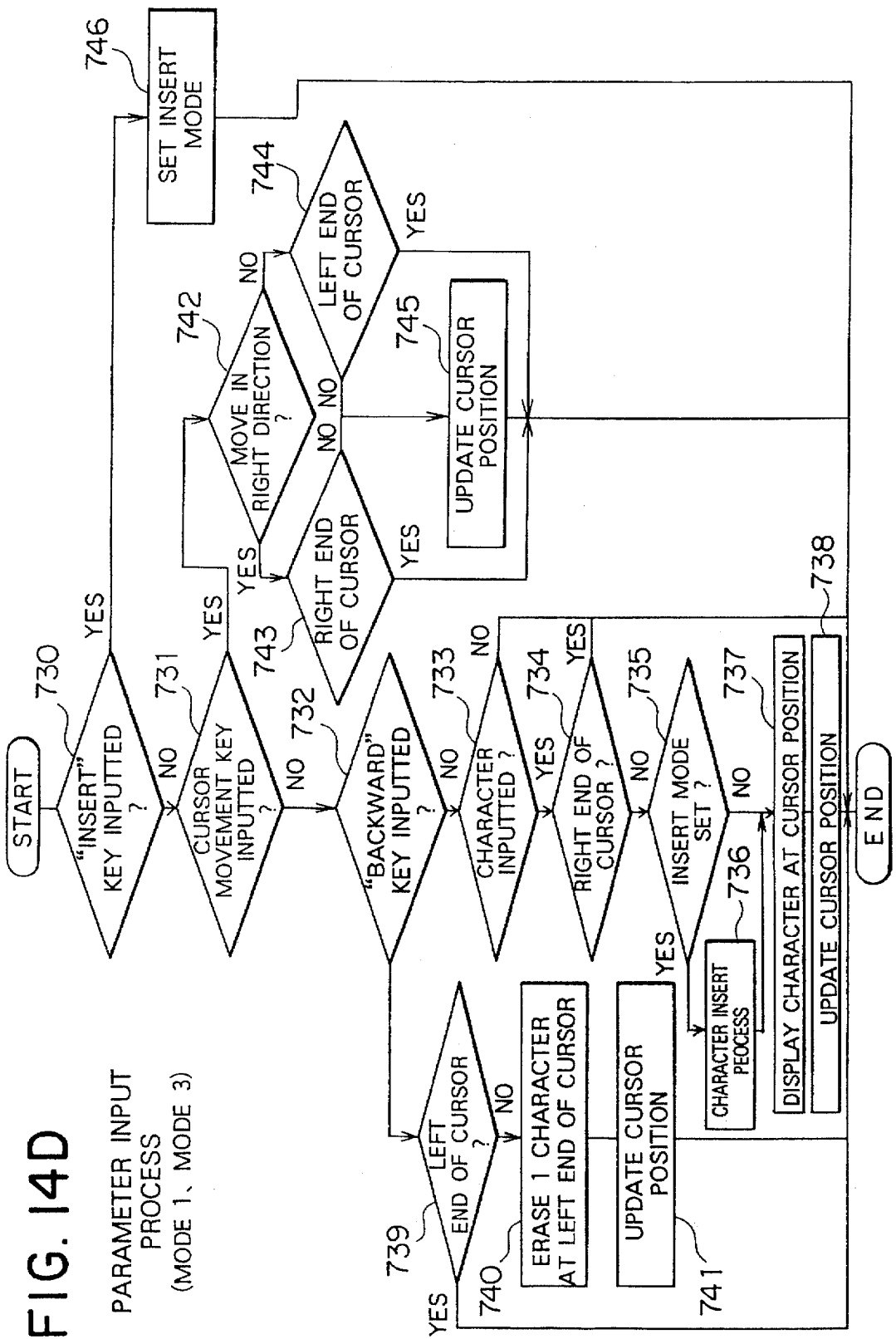
FIG. 14D PARAMETER INPUT PROCESS (MODE 1, MODE 3)

INPUT DATA SETTING PROCESS FOR MODE 1

PROCESS FLOW FOR MODE 2
MODE 2 : MAIN PROCESS

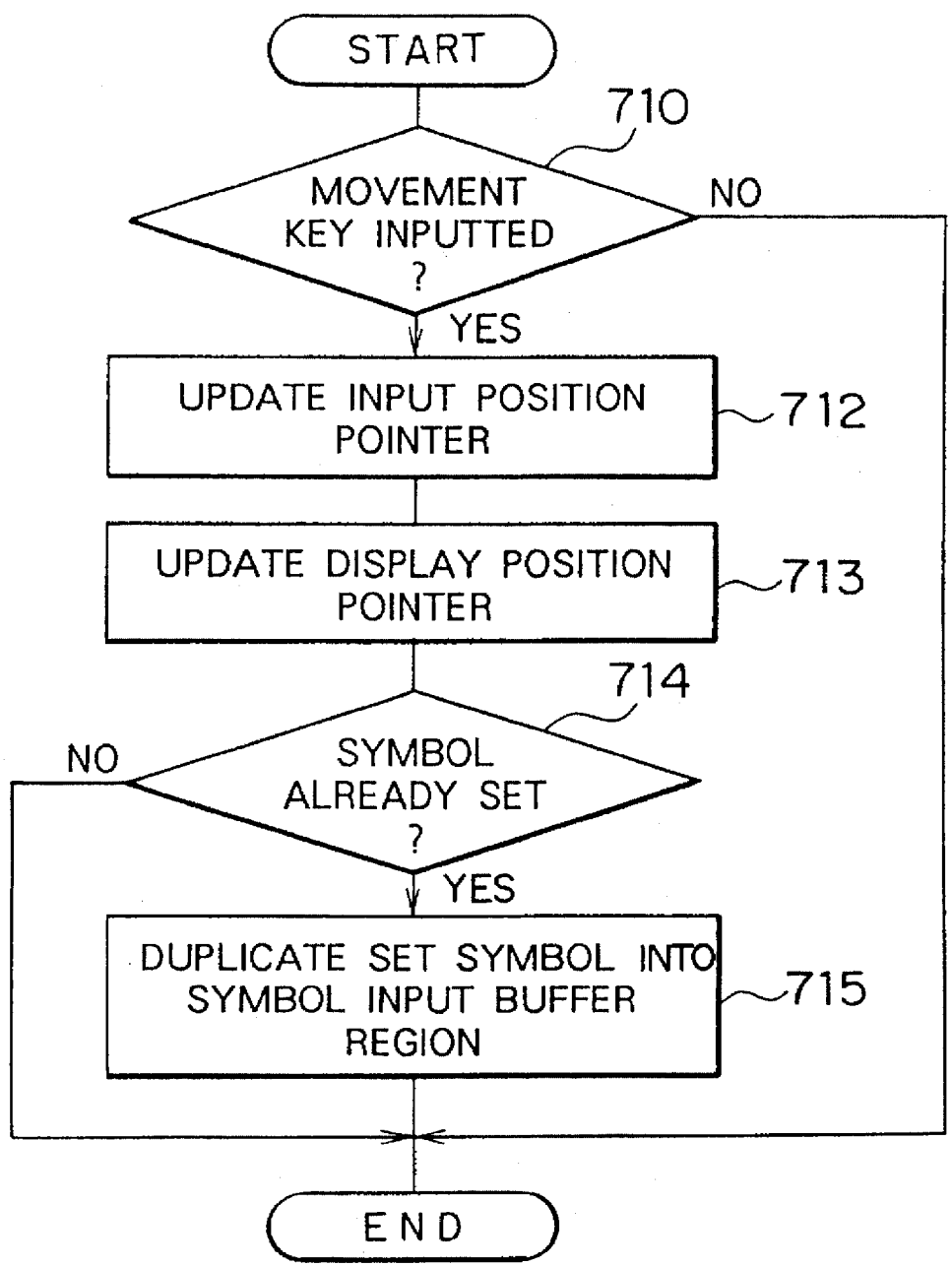

INPUT SETTING PROCESS FOR MODE 2

PROCESS FLOW FOR MODE 3
MODE 3 : MAIN PROCESS

INPUT POSITION CURSOR MOVING PROCESS FOR MODE 3

INPUT DATA SETTING PROCESS FOR MODE 3

PROGRAMMING METHOD AND APPARATUS FOR PROGRAMMABLE CONTROLLER

This application is a continuation of application Ser. No. 07/762,367, filed on Sep. 19, 1991 now abandoned.

BACKGROUND OF THE INVENTION

The present invention generally relates to a programming method and a programming apparatus for a programmable controller. More specifically, the present invention relates to a programming method and a programming apparatus for a programmable controller, capable of forming a sequence program, while forming/editing a ladder diagram on a display screen.

A programming apparatus used for a programmable controller has been known such that a ladder program for continuously connecting relay contacts is formed and edited in an interactive mode on a cathode-ray tube (will be referred to as a "CRT") and the like, so that a sequence program to be stored in a memory of the programmable controller is formed and edited.

In the conventional programming apparatus as described in, for instance, JP-A-56-11502, the size (dimension) of the cursor displayed on the display screen is selected to be one character of each element for the ladder diagram, and a user confirms a portion of the ladder diagram to be changed every 1 character with employment of this cursor. Then, the user operates the movement key to move this cursor to a position of the desirable element, and also sequentially inputs from an input means such as a keyboard, input/output numbers which specify either the circuit symbol of the ladder diagram, i.e., the relay contact symbol, or the relay coil symbol and the parameter, i.e., this relay contact or relay coil.

However, in accordance with this conventional programming apparatus, since the size of the displayed cursor is equal to 1 character, this cursor must be moved every 1 character in case of amendments. Then, when such amendments are performed over the whole ladder diagram, cumbersome cursor movements are required. In particular, there are such risks in the ladder diagram where a large quantity of relay contacts are employed that no confirmation can be made which relay contact is amended or corrected among the similar relay contacts continuously connected with each other, otherwise the relay contact is mistakenly corrected.

Accordingly, in the conventional programming apparatus as disclosed in JP-A-60-221807, the overall line containing the data to be amended is set as the cursor designation region on the display screen where the ladder diagram is displayed, and this cursor designation region is displayed in high brightness in order that discrimination can be achieved which line is being amended.

Furthermore, there is another programming apparatus having the circuit input unit independent from the circuit display unit to form and edit the ladder diagram. An operator enters the required symbols from the circuit input unit, and thereafter inputs the parameters to be attached to these symbols, and also transfers the symbol and parameter as a pair of input items to the circuit display unit by the specific key input instruction. As a result, this pair of input items is displayed on the position of the display screen designated by the input position cursor, and this input position cursor is advanced to the next position. The display contents of the symbol and parameter for the position to which the input position cursor has newly moved, are reflected in the setting content of the circuit input unit, whereby the present setting content of this display position can be confirmed by the input unit. In other words, if the symbol and parameter have been already displayed at the position to which the input position cursor was moved, these symbol and parameter become the content of the circuit input unit, whereas if no symbol and parameter have been displayed there, the content of the circuit input unit is cleared.

Also, in the conventional programming apparatus, both the symbol and parameter must be entered as one pair of input items and also the symbol must be inputted prior to this parameter so as to form and edit the ladder diagram. As a consequence, it is not possible to perform such a free sequence input operation that after only one pair of symbol and parameter is inputted prior to plural pairs of symbols and parameters, other pairs are inputted.

When the symbols and parameters are sequentially inputted, since the content of the circuit input unit is cleared every time the input position cursor is moved to the new position, the same symbol must be again newly inputted in case that the same symbol is continuously inputted.

Furthermore, when the circuit is erroneously inputted or amended, both the symbol and parameter must be newly reentered. For instance, when the key is mistakenly depressed, both the symbol and parameter are once erased, and then must be newly reentered.

As previously stated, there are problems in operabilities of the conventional programming apparatuses due to restriction in key input operations. Moreover, there is another problem that the portion which need not be changed must be further reentered during the input and amendment operations, with the result that a total key entry number is increased and thus the efficiency of the programming operation is lowered.

SUMMARY OF THE INVENTION

The above-described prior art owns such an advantage that the correction region can be designated every 1 line and thus the correction region can be definitely displayed. However, there is such a problem that in the ladder diagram where the similar elements are present within this 1 line, the amendment portion within this 1 line cannot be definitely displayed.

Also, another problem is that since the size of representation for the amendment is small, it provides difficult confirmation.

Furthermore, in case that the input/output number of a certain relay contact is mistakenly inputted, it is not possible to correct only this erroneously inputted character. Thus, the entire element must be erased and thereafter the correct element must be newly reentered.

An object of the present invention is to obtain a programming method and a programming apparatus for a programmable controller, capable of readily confirming which element of a ladder diagram displayed on a display screen has been designated when a sequence program is inputted and amended.

Another object of the present invention is to obtain a programming method and a programming apparatus for a programmable controller, capable of easily amending an arbitrary element of the ladder diagram.

A further object of the present invention is to provide a programming apparatus for a programmable controller, capable of improving operabilities by increasing a free degree of input operation for a symbol and a parameter, and capable of simply amending an inputted circuit, thereby achieving effective programming operation.

In accordance with the present invention, an element which constitutes a unit of input/amendment for a sequence program, is constructed of at least a symbol element representative of a circuit symbol and also a character element indicative of a parameter. The symbol element implies: a relay contact symbol indicative of a relay contact; a relay coil symbol representative of a relay coil; a comparing box symbol for performing such a judgement whether or not a condition is satisfied upon receipt of a comparing instruction of input/output data; and also a calculating box for executing such a calculation when the conditions of the ladder diagram positioned before and after this calculating box are satisfied upon receipt of a calculation command. The character element implies: input/output numbers or abbreviated numbers which are allocated to either the relay contact or the relay coil; the comparison command described within the comparing box; or the calculation command described within the calculating box.

To achieve the above-described objects, according to the feature of the present invention, in a programming apparatus for a programmable controller, for designating either a data inputting portion or a data amending portion of a ladder diagram displayed on a display screen by way of a cursor, at least two cursors are employed for designating either the data inputting portion or the data amending portion. Then, the respective elements to constitute the ladder diagram are designated by a first cursor (large cursor) and the character element within the designated element is designated by a second cursor (small cursor) which is moved within the first cursor.

Further, the above-described objects may be achieved by displaying either a data inputting area, or a data amending area in an enlargement mode when the data is inputted or amended with employment of the small cursor.

In addition, the above-described objects may be achieved by displaying the representation within the large cursor in an enlargement mode, as compared with the representation of the above ladder diagram.

Moreover, the above-described objects may be achieved by moving the cursor whereby only the data on the designated amending portion is corrected and the data other than the designated amending portion are utilized without any correction, and thus a partial amendment is carried out.

To achieve the above-described objects, the present invention is characterized in that in a programming apparatus for a programmable controller, for producing a sequence program used to a programmable controller by forming a ladder diagram on a display screen, it comprises:

display means for displaying a ladder diagram constructed of various circuit symbols and parameters attached to the respective circuit symbols;

symbol input means for inputting said circuit symbols; and, parameter input means for inputting said parameter, one means of said symbol input means and said parameter input means being capable of inputting, irrelevant to an input operation of the other means.

In this programming apparatus, preferably, a display screen displayed by said display means is subdivided into a circuit display region and a circuit input region, the circuit input region has a symbol input region and a parameter input region; the symbol and parameter which have been inputted by said symbol input means and said parameter input means, respectively, are once displayed on said symbol input region and said parameter input region, and are transferred to said circuit display region in response to an instruction of an operator so as to be displayed.

The above-described display means displays, preferably, a first cursor for instructing input positions of the circuit symbol and parameter on said circuit display region and a second cursor for indicating an input device of a character on said parameter input region.

The above symbol input means selects one circuit symbol from plural sorts of circuit symbols which have been previously registered, in response to an instruction issued by an operator. For instance, it is so arranged that the symbol input means cyclically and successively selects the plural sorts of circuit symbols which have been previously registered every time the operator issues the instruction.

The above-explained parameter input means freely moves said second cursor in response to the instruction issued from the operator, and is capable of amending only a portion of character series which has been previously inputted.

The programming apparatus preferably further comprises: means for duplicating said circuit symbol into said symbol input region when said first cursor is moved and if the circuit symbol is already present at this position, and for maintaining a display content of said symbol input region if the circuit symbol is not present at this position.

Similarly, the programming apparatus preferably further comprises: means for duplicating said parameter into said parameter input region when said first cursor is moved and if the parameter is already present at this position, and also for maintaining a display content of said parameter input region if the parameter is not present at this position.

Another programming apparatus according to the present invention is characterized in that in a programming apparatus for a programmable controller, for producing a sequence program used to a programmable controller by forming a ladder diagram on a display screen, it comprises:

display means for displaying a ladder diagram constructed of various circuit symbols and parameters attached to the respective circuit symbols;

symbol input means for inputting said circuit symbols;

parameter input means for inputting said parameters; and, operation mode control means capable of selecting a first mode under which both a symbol and a parameter can be inputted; a second mode under which only a symbol can be inputted; and a third mode under which only a parameter can be inputted.

Furthermore, a programming apparatus according to the present invention is characterized in that in a programming apparatus for a programmable controller, for producing a sequence program used to a programmable controller by forming a ladder diagram on a display screen, it comprises:

ladder diagram storage means for storing both the respective sorts of symbols to constitute the ladder diagram displayed on said display screen and parameters attached to the respective circuit symbols;

display means for displaying as the ladder diagram, the circuit symbols and parameters which have been stored in said ladder diagram storage means;

symbol input means for inputting said circuit symbols;

symbol temporarily storing means for temporarily storing one circuit symbol inputted from said symbol input means;

parameter input means for inputting said parameter;

parameter temporarily storing means for temporarily storing one parameter inputted from said parameter input means; and, means for transferring contents of said symbol temporarily storing means and also of said parameter temporarily storing means to said ladder diagram storage means in response to an instruction issued from an operator.

With the above-described arrangements, the operator can easily recognize at a glance which element is being edited/amended by designating the entire region containing the amending portion by the large cursor, and also which element displayed on the display screen has been designated when inputting/correcting the ladder diagram.

Also, since the element containing the amending portion is displayed in an enlargement mode, more easier confirmation may be achieved.

In addition, when the data is inputted into the element, this element is enlarged whereby it can be easily observed. As a consequence, the erroneous inputs may be considerably reduced and thus the work loads given to the operator may be lowered while performing the programming operation.

Moreover, since the amendment may be partially performed, the amendment is available in only the amending portion so that the work loads given on the operator may be furthermore reduced.

Further, according to the present invention, one of the symbol input means and the parameter input means can be operable in terms of its inputting operation independently of the other. In other words, it is unnecessary to successively input symbols and parameters corresponding to the inputted symbols alternately. That is, all the symbols may be inputted first, followed by inputting of the parameters. Conversely, all the parameters may be inputted first, followed by inputting of the symbols.

Further, in the case of new inputting operation, since the last inputted contents remain present in each of the symbol and parameter input regions without being cancelled, these contents can be used for the next inputting operation.

In the case of correcting a circuit, by moving an input position cursor in the circuit display region to a portion to be corrected, the symbol and parameter displayed at the portion to be corrected are copied into the symbol and parameter input regions, thereby making it possible to correct the circuit by correcting only the portion to be corrected.

BRIEF DESCRIPTION OF THE DRAWINGS

FIG. 1 shows a display screen of a programming apparatus according to a preferred embodiment of the present invention;

FIG. 2 represents a display screen of a ladder diagram;

FIGS. 4A and 4B are a key operation sequence diagram and a display screen diagram with respect to a cursor display of a comparing box;

FIG. 12 is a block diagram for explaining functions of the programming apparatus according to the present invention;

FIGS. 14A to 14E are flow charts for explaining a process of mode 1;

FIGS. 15A to 15C are flow charts for explaining a process of mode 2; and,

DESCRIPTION OF THE PREFERRED EMBODIMENTS

Referring now to drawings, preferred embodiments according to the present invention will now be described more in detail.

Figure 7:
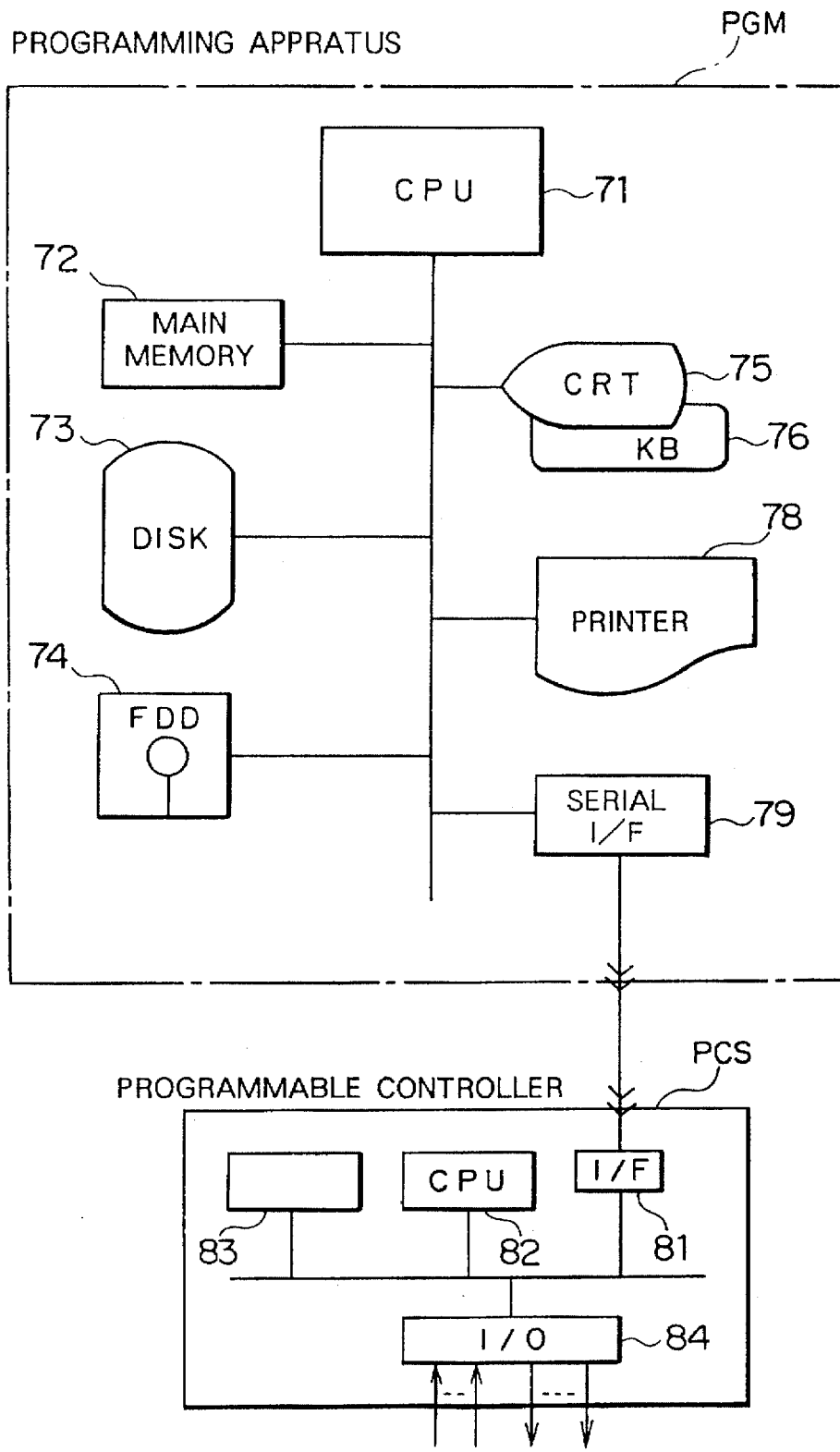
FIG. 7 is an arrangement diagram of PCS relating to one preferred embodiment of the present invention.

In FIG. 7, there is shown an example of hardware arrangements of a programming apparatus and a programmable controller, according to the present invention, which loads a sequence program formed by this programming apparatus. The programming apparatus PGM surrounded by a dot and dash line of this figure performs operations of the present invention.

The programming apparatus PGM is so arranged by a main memory 72 functioning as an internal storage device for storing a control program, data and the like used for programming; a hard disk apparatus (DISK) 73 and a floppy disk apparatus (FDO) 74 functioning as an external storage apparatus; a CRT (cathode-ray tube) functioning as a display apparatus; a keyboard (KB) 76 functioning as an input apparatus; a printer 78 functioning as a printing apparatus; a serial interface 79 for transmitting a formed sequence program; and, a central processing unit (CPU) for controlling an overall operation of the programming apparatus. On the other hand, the programmable controller PCS is constructed of an interface 81 for receiving the sequence program transmitted from the programming apparatus PCS; a memory for storing the received sequence program; a CPU for executing this program; and an input/output device (I/O) 84 for transmitting/receiving data between devices under control.

CPU 71 executes a display screen control of CRT 75; forms a ladder program in response to key entries by a user via the keyboard 76; and stores the formed ladder program into the hard disk 73. Upon completion of a series of program, CPU 71 transfers the program via the serial interface 79 to the programmable controller PCS in accordance with the key operation by the user.

FIG. 1 represents a display screen of the programmable controller PCS of the programming apparatus according to one preferred embodiment of the present invention. That is, this drawing is a ladder diagram for displaying an arrangement of elements which can be arranged within one display screen.

In case of this preferred embodiment, 63 elements in total where 9 columns of relay contacts 13 and 7 lines of relay coils 14 are arranged may be displayed. In FIG. 1, reference numeral 11 denotes a large cursor. This large cursor 11 is moved by every 1 element in unit of element "E" and indicates an overall element E (namely, an element "E" constructed of a symbol element E1 and a character element E2), in other words, an overall region surrounded by a thick frame either at higher brightness, or a reverse mode representation. As a consequence, a user can easily recognize at a glance which element has been designated for the sake of amendment. Inside this large cursor 11, a small cursor 12 is displayed which is moved by every 1 character within this large cursor 11. Then, in case that, for instance, an input number "X123" of the character element E2 is amended by "X124" by using this small cursor 12, the small cursor 12 is moved to a display position "3" and "4" is entered by operating the input device, whereby the above-described amendment can be achieved.

FIG. 2 shows an example of a comparing box 23 and a calculating box 24 which have been, very recently, developed as an application instruction of a ladder diagram. This comparing box 23 performs the same operation as a relay contact in such a manner that a comparison instruction of input/output data is inputted and a comparison is made whether or not a condition thereof is satisfied. Then, the calculating box 24 executes a calculation when an arithmetic calculation instruction is entered and conditions of ladder diagrams positioned before and after the calculating box 24 are satisfied. In accordance with a programming operation with employment of the boxes 23 and 24, overall boxes corresponding to the element E are designated by the large cursor 21 and a content within the large cursor 21 is displayed at higher brightness or under reverse condition. Then, the comparison instruction or the like is entered into the large cursor 21, namely the relevant box by the small cursor 22 which can be moved only in the large cursor 21.

Referring now to FIGS. 3 to 6, operations of the large cursor and also the small cursor will be described. FIG. 3A represents a key operation sequence for the cursor corresponding to a relay contact. A representation within the actual large-cursor in the state numbers "$S_{r0}$" to "$S_{r2}$" shown at an upper side of FIG. 3A, is indicated in relation to FIG. 3B. First, the large cursor is moved to a desirable element position by operating a cursor moving key arranged on the keyboard 76. At this time, the representation of the state $S_{r0}$ is made and then a region within the large cursor is displayed at higher brightness or reverse mode. Thereafter, in case that the relay contact within this region is changed into b-contact, a symbol key "F2" of the b-contact arranged on the keyboard 76 is depressed under this condition. It should be noted that in case of the preferred embodiment, symbol keys have been determined with respect to each of symbol and element sorts, and a desirable element can be designated/inputted by depressing the corresponding symbol key. In this preferred embodiment, as previously explained, the function keys are employed as the symbol keys. For example, the symbol elements corresponding to the function keys F1 to F10 arranged on the keyboard 76 are displayed at the lower side of the display screen shown in FIG. 8A, for the sake of easy understanding to users. That is to say, in accordance with this preferred embodiment, with respect to the function keys F1, F2, F3, F4, F5 and F6 arranged on the keyboard 76, an a-contact symbol, a b-contact symbol, a coil symbol, a comparing box symbol, a calculating symbol and a longitudinal connecting line symbol have been allocated. Further, moving control keys for the small cursor have been allocated to the function keys F7, F8, F9 and F10.

Figure 3A:
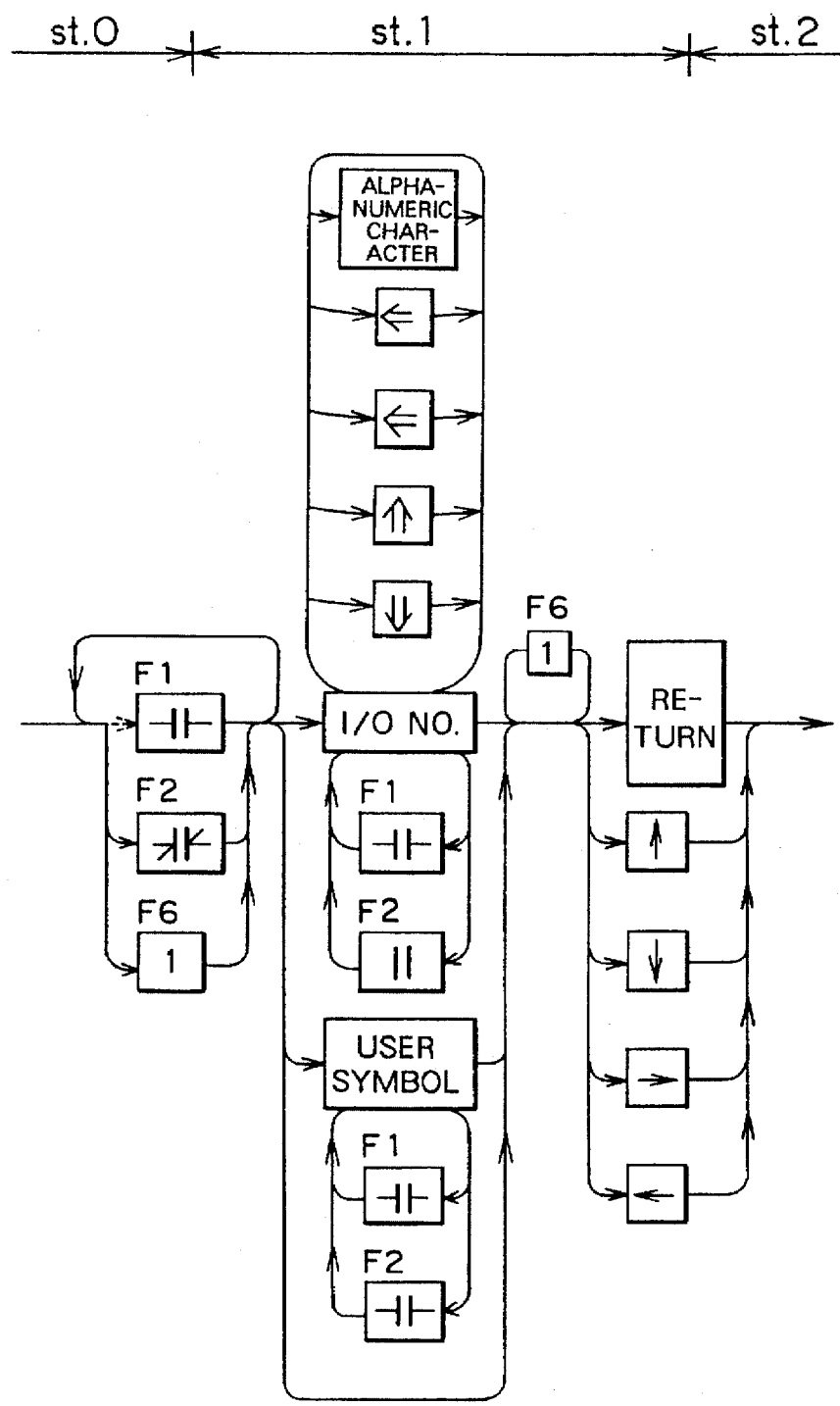
FIGS. 3A to 3C are a key operation sequence diagram, a display screen and a diagram for explaining an operation screen sequence with respect to relay contacts and cursor displays.
Figure 3B:
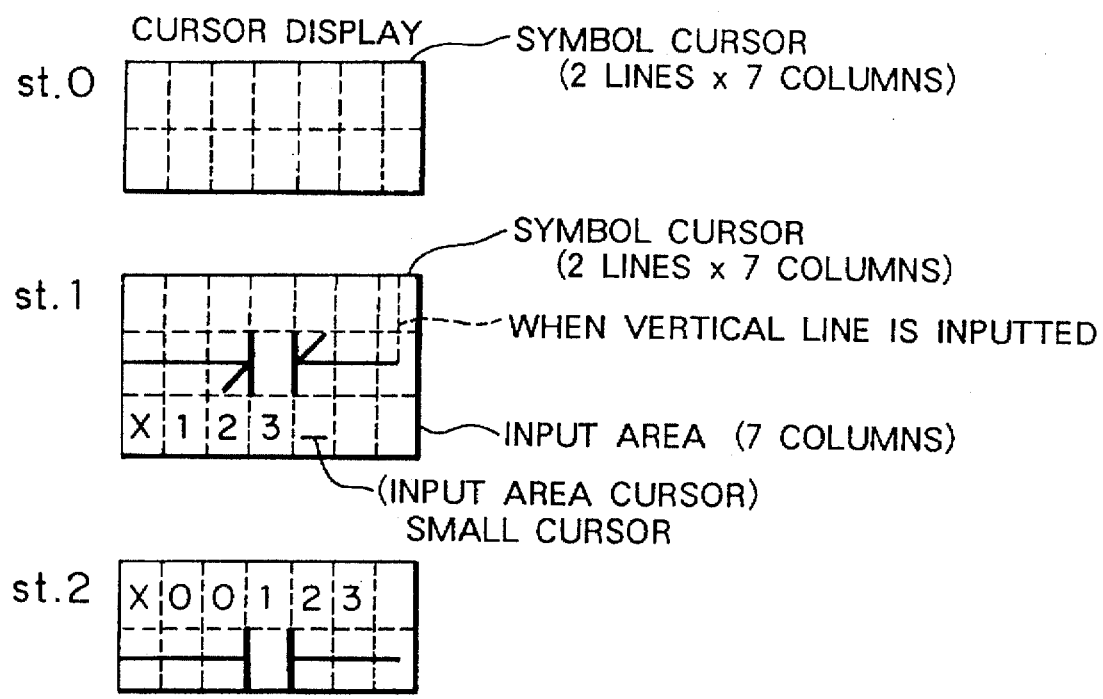

In the above-explained example, when the "F2" key is depressed, a condition of a middle part of FIG. 3B, namely an area into which an input number is entered under the symbol of "b-contact" is represented. Under this condition, upon input of input number and the like from the keyboard 76, the small cursor is successively moved and this input number and the like are entered. This input operation corresponds to the operation at the upper side of "I/O NO" shown in FIG. 3A. After the input number has been inputted, a "return" key is depressed so that the display state is returned to the state $S_{r2}$. As a result, as shown in "$S_{r2}$" of FIG. 3B, data on the input number are moved up to the upper side of the b-contact symbols and displayed, whereby either the input operation or correcting operation of this element has been accomplished.

Figure 3C:
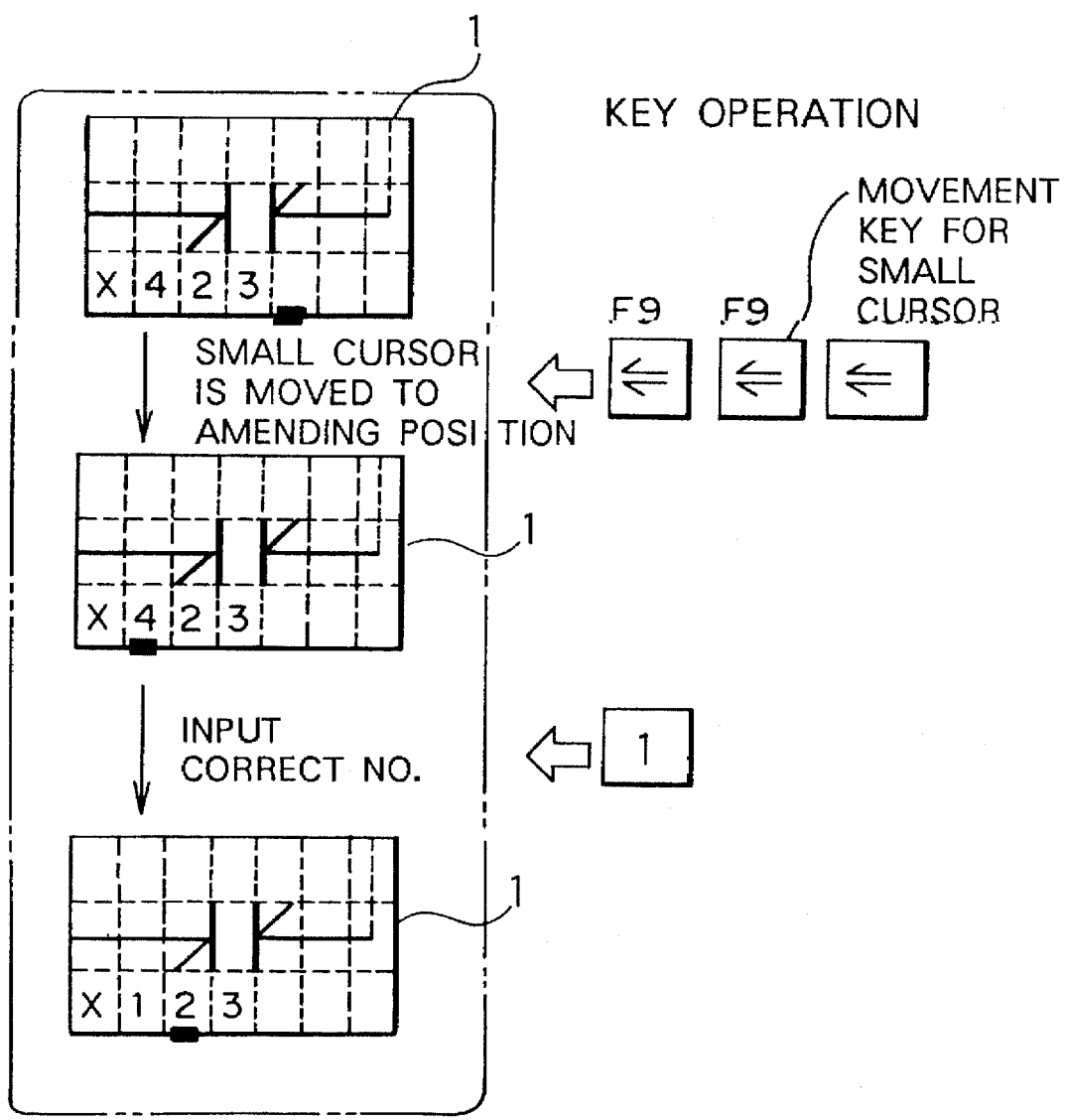

FIG. 3C is an explanatory diagram for showing such a correction case that "X423" is mistakenly inputted instead of "X123" as the input number. In this case, first the small cursor is moved by three characters in the left direction so as to be positioned under "4". Then, when the numeral key "1" provided on the keyboard 76 is depressed under overwriting state, this can be amended by the correct input number. In this case, such an amendment is completed by operating the keys 4 times.

In the conventional case, either all of the incorrect input numbers must be erased and all of the correct input numbers must be entered, or when the cursor is moved by 2 characters along the left direction thereby to erase characters there, the input numbers "1", "2" and "3" must be newly inputted.

FIG. 4A represents a key operation sequence when the large cursor is moved to the comparing box, and FIG. 4B shows an example of screens corresponding to the states $S_{r0}$, $S_{r1}$, and $S_{r2}$ as shown in the upper side of FIG. 4A. First of all, the large cursor is moved to a desirable element position by operating the cursor moving key arranged on the keyboard 76 ($S_{r0}$) and the symbol key "F3" indicative of the comparing box is depressed. As a result, the state is moved to the state $S_{r1}$. Thereafter, the small cursor is moved in a similar manner to that of FIG. 3A (not shown in FIGS. 4, 5 and 6), in order to enter the comparison instruction. Then, when the "return" key is depressed, the condition is moved to the state $S_{r2}$ where the above-described comparison instruction is inputted and displayed within the box.

Figure 5A:
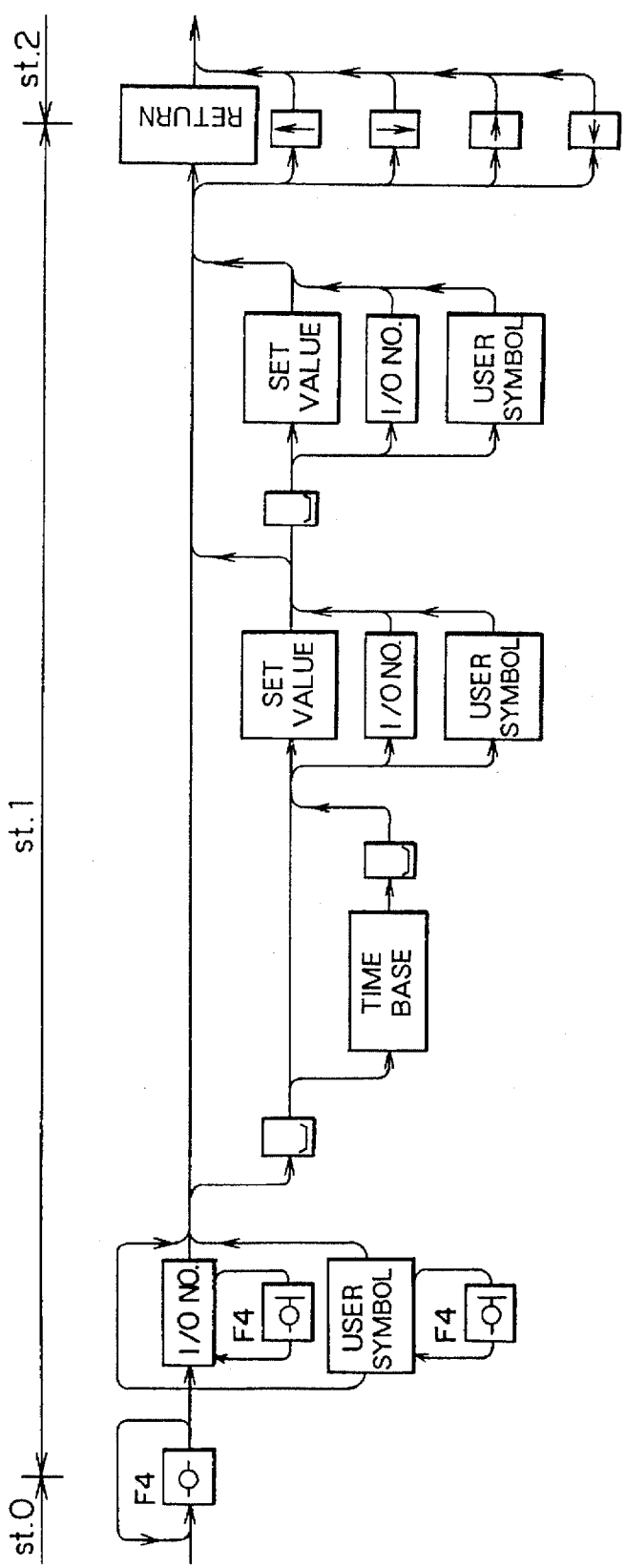
FIGS. 5A and 5B are a key operation sequence diagram and a display screen diagram with respect to a cursor display of relay coils.
Figure 5B:
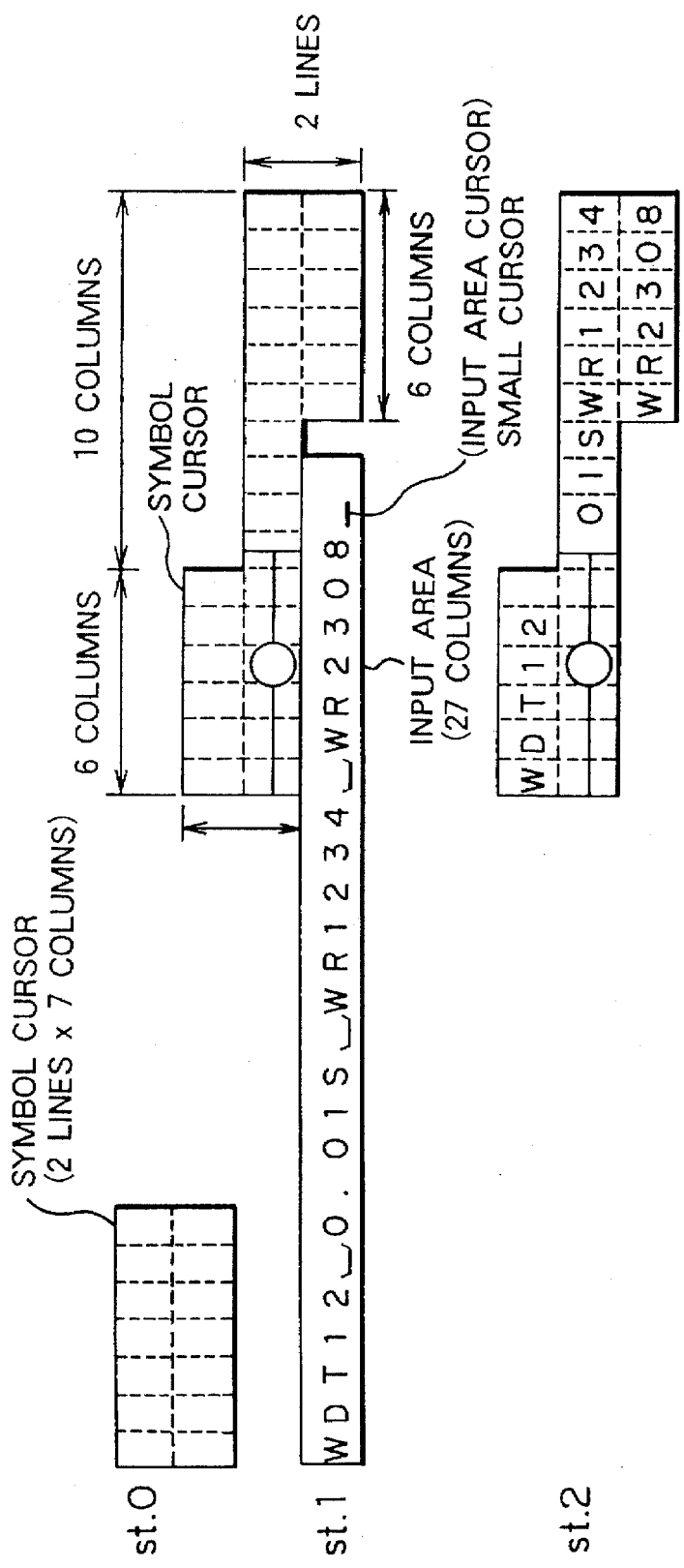
Figure 6A:
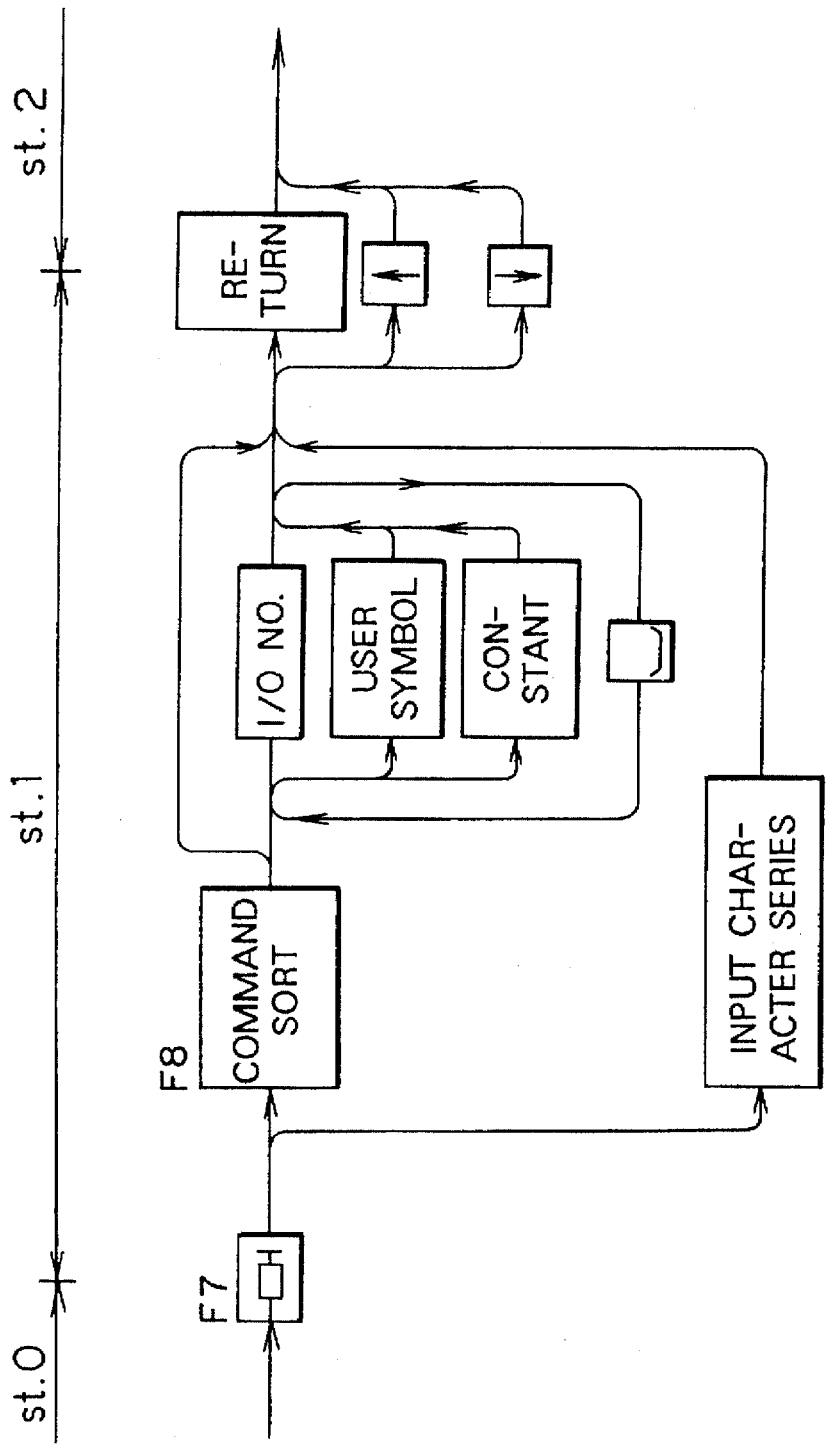
FIGS. 6A and 6B are a key operation sequence diagram and a display screen diagram with respect to a cursor display of a calculating box.
Figure 6B:
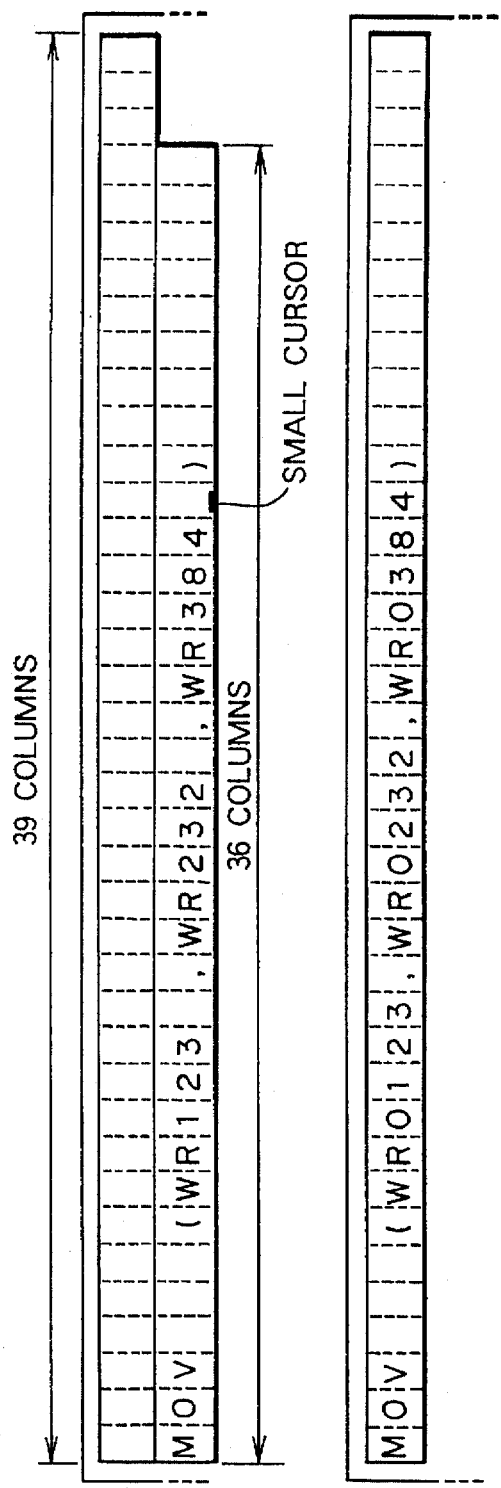

FIG. 5A represents a key operation sequence in case that the large cursor is moved to the relay coil, and FIG. 5B represents an example of display screens corresponding to the states $S_{r0}$, $S_{r1}$ and $S_{r2}$ shown in the upper side of FIG. 5A. FIG. 6A represents a key operation sequence in case that the large cursor is moved to the calculating box, and FIG. 6B represents an example of display screens corresponding to the states $S_{r0}$, $S_{r1}$ and $S_{r2}$ shown at the upper side of FIG. 6A. As shown in FIGS. 3 to 6, in the input screen (condition of the state $S_{r2}$), the input area is largely expanded so as to easily input the input number and comparison instruction. This is because the data correction may be simply corrected by way of the small cursor.

Figure 8A:
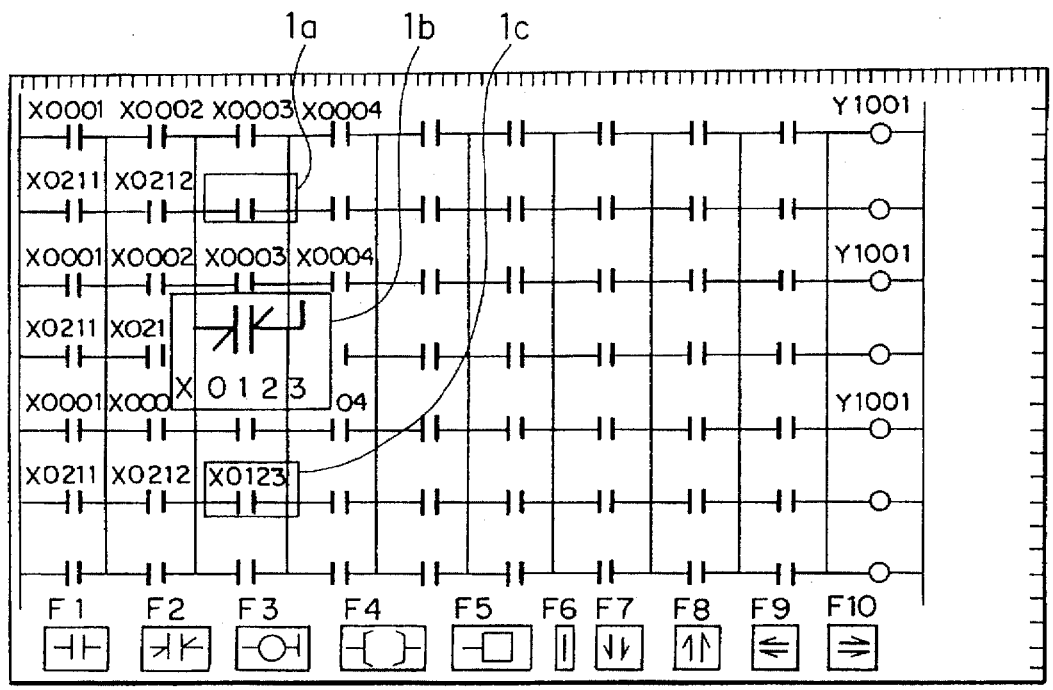
FIGS. 8A and 8B are an overall screen and an input screen with respect to an enlarged display of a cursor.
Figure 8B:
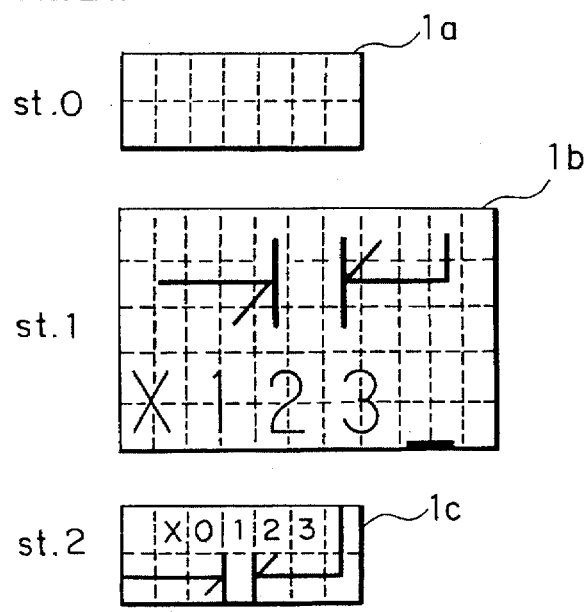

Furthermore, another preferred embodiment capable of readily correcting the input data is shown in FIGS. 8A and 8B. In this preferred embodiment, when the display of the cursor becomes the state $S_{r1}$, a larger representation than that of FIG. 3B is made. A representation of symbol "1b" shown in FIG. 8A is so made that sizes of the contact symbol and input number are two times larger than those of the previous symbol and number, whereby the input position and input data can be readily recognized.

In the above-described preferred embodiments, the elements designated by this cursor 11 have been displayed at the higher brightness or in the reverse mode by moving the large cursor 11. Alternatively, other display conditions such as color representations, sizes of lines and characters, which are distinguishable from the above elements, may be employed. In other words, these elements may be distinguishably displayed as compared with other elements.

Figure 9:
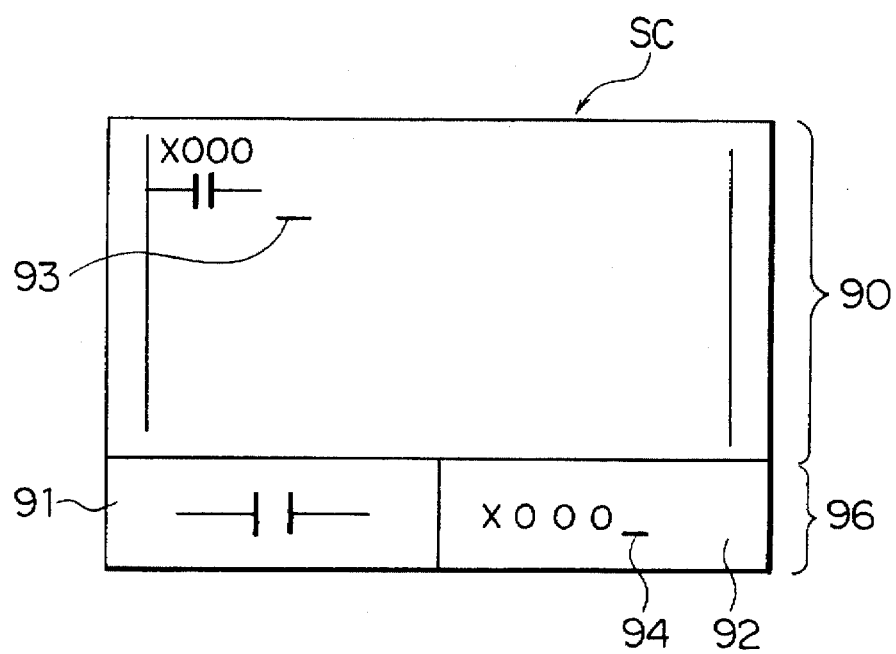
FIG. 9 is a diagram for explaining an example of CRT display screen when a circuit is inputted according to one preferred embodiment of the programming apparatus according to the present invention.

FIG. 9 shows an example of display screen of a programming apparatus according to another preferred embodiment of the present invention. A display screen SC is subdivided into a circuit display region 90 and a circuit input region 96. The circuit input region 96 includes a symbol input region 91 and a parameter input region 92.

In the symbol input region 91 and the parameter input region 92, an internal storage area (will be discussed later) and a key operation (will be explained later) are independent from each other and a symbol and a parameter may be inputted asynchrously. That is to say, either one of the symbol and parameter may be inputted, otherwise both of them may be alternately inputted. Even when both of them are alternately inputted, either the symbol or parameter may be firstly entered. A symbol is inputted by depressing a plurality of specific keys corresponding to the symbols, otherwise a plurality of symbols which have been previously registered may be cyclically inputted in turn in accordance with depression of a single key. In a concrete example (will be discussed later), the latter method has been employed. A parameter is inputted by operating an alphabetic key and a numeral key.

FIG. 12 is a schematic block diagram for representing a functional arrangement of the programming apparatus according to this preferred embodiment.

In FIG. 12, a symbol has been registered in a symbol storage region 122 functioning as the internal storage area. In this example, every time the "F1" key is depressed, the symbol designated by a symbol pointer 123 is temporarily stored into a symbol input buffer region 121a as the internal storage area for inputting the symbol, and the symbol pointer 123 is successively updated. This symbol is displayed on a symbol input region 91 on the display screen SC. A parameter is temporarily stored in a character input region 121b functioning as the internal storage area for the parameter by depressing the alphabetic key and numeric key. This parameter is displayed on a parameter input region 122 on the display screen SC. A parameter input cursor 94 is controlled by a character input position pointer 128. The parameter input cursor 94 is freely movable within the parameter input region 92 in response to an instruction made by a user, so that amendments of erroneous inputs can be simply performed.

After the symbol and parameter have been entered, at a time instant when the "return" key is depressed, a content of the inputted data is confirmed, and then both the symbol and parameter are stored into a predetermined position within an edition storage region 120 functioning as an internal storage area used for editing a circuit, which is designated by an input position pointer 124. In accordance with the present embodiment, the input position pointer 124 designates a storage area of a circuit symbol, and a subsequent storage area becomes a storage area of the corresponding parameter. In accordance with the storage contents of the edition storage region 120, a circuit of a circuit display area 90 on the display screen SC is displayed. In this example, both the symbol and parameter which have been determined are displayed at an input position cursor 93 of the circuit display region 90. After this display operation, the input position cursor 93 is moved to the next input position. Also after the input decision, since both the symbol input region 91 and the parameter input region 92 are kept under the previous condition, this condition may be utilized as the subsequent input. The position of the input position cursor 93 is controlled by the display position pointer 125.

Figure 10:
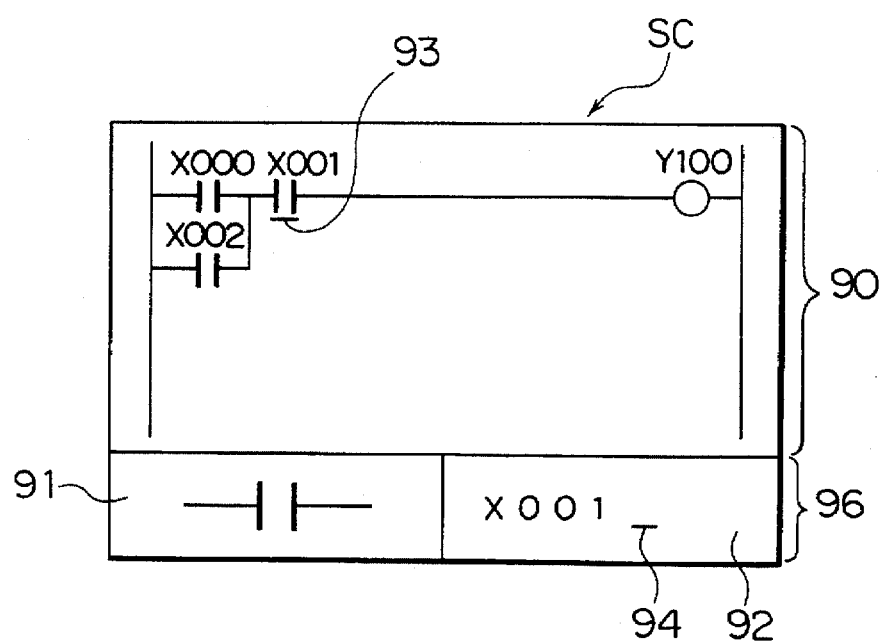
FIG. 10 is a diagram for explaining an example of CRT display screen when a circuit is amended.

FIG. 10 represents an example of a display screen where a circuit which has been formed is corrected. In case that the previously formed circuit is corrected, the input position cursor 93 is moved to a position of a symbol to be amended. At this time, the symbol and parameter which have been displayed at a position of the input position cursor 93 are stored into a symbol input buffer region 121a and a parameter input buffer region 121b, and then displayed on a symbol input region 91 and a parameter input region 92. After at least one of the symbol and parameter displayed in this symbol input region 91 and parameter input region 92 is changed/amended, if the return key is depressed, the memory content of the edition storage region 120 is amended and the symbol and/or parameter present position of the input position cursor 93 can be changed/amended. At this time, since a parameter input cursor 94 is freely moved in a horizontal direction by way of an exclusively used movement key and only the character to be changed can be corrected, the correction steps may be reduced.

Subsequently, a further preferred embodiment according to the present invention will now be described with reference to FIGS. 11A to 11C. In this preferred embodiment, there are prepared as the circuit input mode; a symbol/parameter simultaneous input mode; a symbol input mode; and a parameter input mode. Every time the "F2" key is depressed, the input mode is reportedly varied as follows in this order the symbol/parameter simultaneous input mode; the symbol input mode; the parameter input mode; and the symbol/parameter simultaneous input mode. Every time the mode is changed, the background color of the input unit by which the data can be entered is varied, whereby it represents which mode has been selected. It should be noted that the same circuit arrangements as shown in FIGS. 7 and 12 are available as an arrangement of the programming apparatus according to this preferred embodiment.

Figure 11A:
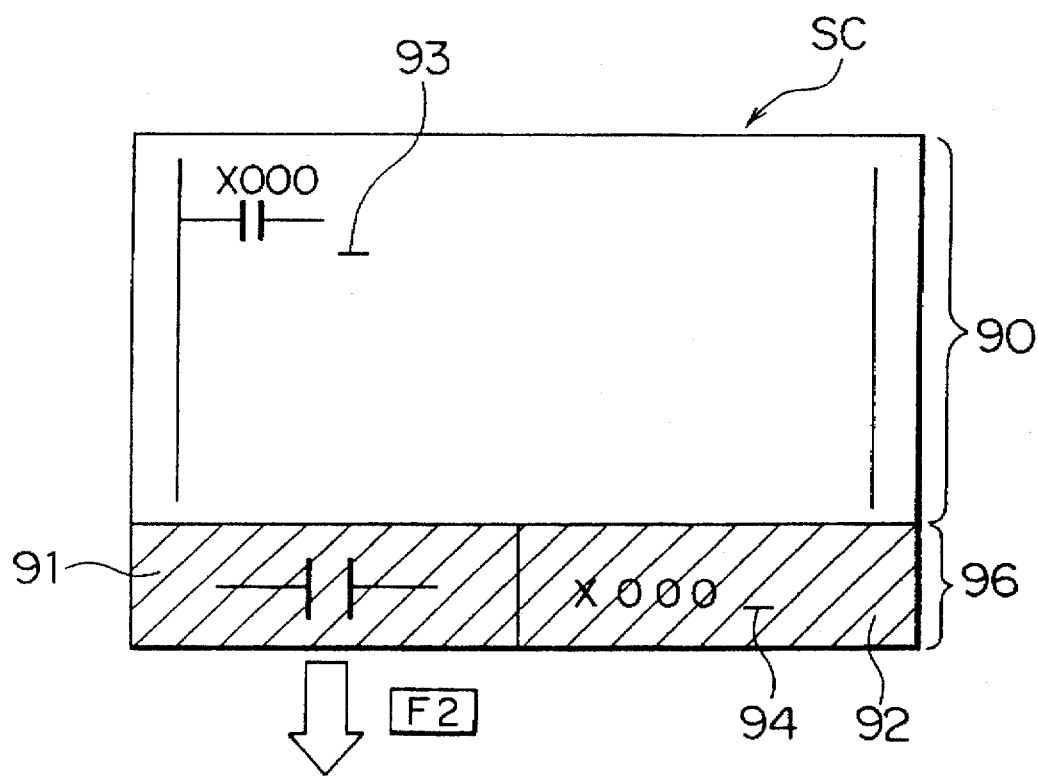
FIGS. 11A to 11C are diagrams for explaining three operation modes according to another preferred embodiment of the present invention.
Figure 11B:
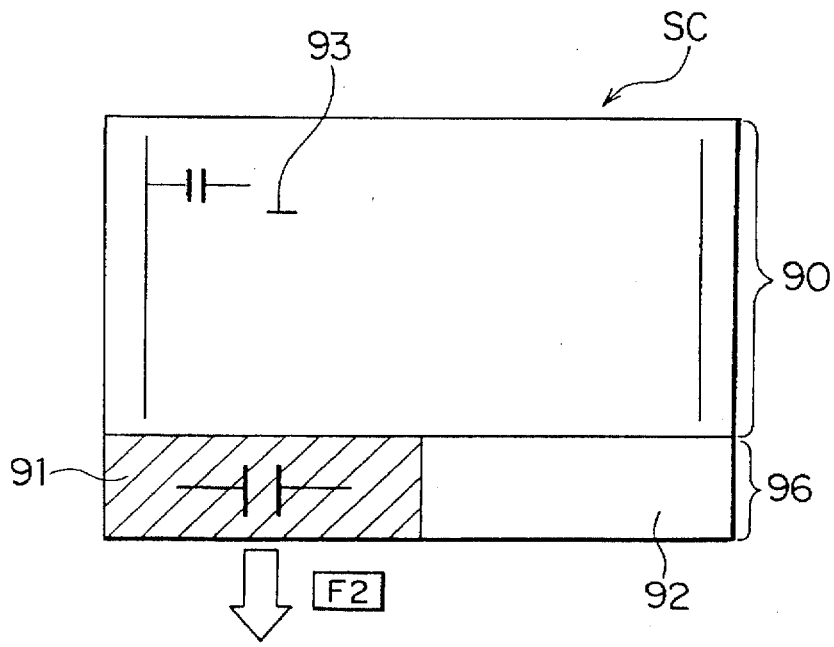
Figure 11C:
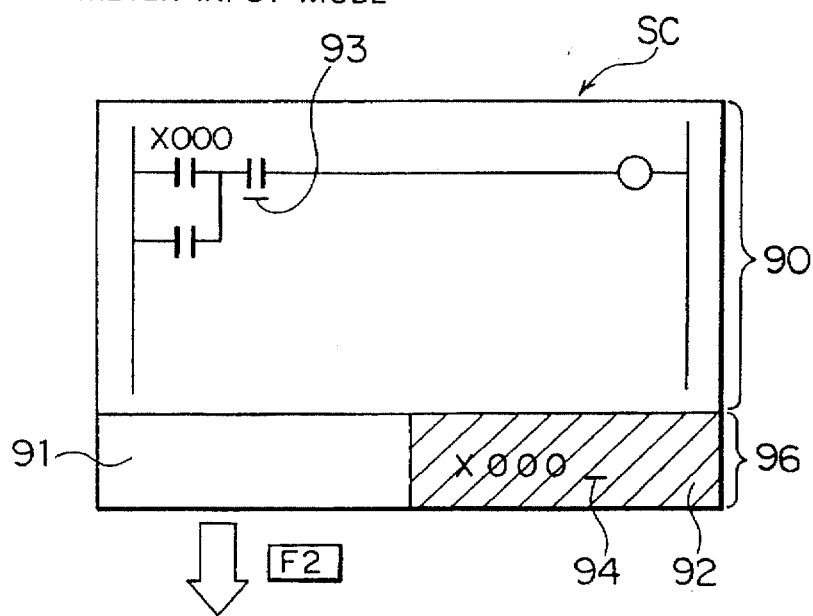

FIG. 11A represents an example of a display screen with respect to the symbol/parameter input mode (mode 1), and an input method is the same as that of the previous preferred embodiment. That is to say, any one of the symbol and parameter can be inputted, and when the "return" key is depressed, both the symbol and parameter are stored at the designated position of the edition storage region 120. FIG. 11B is another example of a display screen for the symbol input mode (mode 2). In this mode, after the symbol has been inputted into the symbol input region 91, only the symbol may be continuously inputted, changed by determining the "return" key. The content of the parameter input buffer region 121b is neither changed by the movement of the input position cursor 93, nor transferred to the edition storage region 120 by depressing the "return" key. As a consequence, in case of new input operation, the parameter is not displayed at a position indicated by the input position cursor 93. Also, there is no risk that the parameter is mistakenly changed when the symbol is amended. FIG. 11C shows an example of a display screen for the parameter input mode (mode 3). In this mode, after the parameter has been inputted into the parameter input region 93, only the parameter can be continuously inputted/amended by surely depressing the "return" key. In this case, the content of the symbol input buffer region 121a is neither changed even by the movement of the input position cursor 93, nor be transferred to the edition storage region 120 by depressing the return key. As a consequence, there is no risk that the symbol is erroneously changed when amending the parameter.

In accordance with the mode 2 and mode 3, it is possible to freely enter the parameters after all of circuit patterns have been inputted. Also, in case that the symbols at the plural display positions are desired to be amended by the same symbols, if the mode 3 is effective only while the input position cursor 93 is moved, the stored content of the symbol input buffer region 120a is not changed while the cursor is being moved. Thus, the operation for reentering the symbol can be omitted so that both operability and process efficiency of the programming apparatus can be improved. In particular, in case of this preferred embodiment where there are no keys for each of the symbols, since a relatively large quantity of key operations are required to select the symbols, this particular effect is furthermore emphasized.

FIGS. 13 to 16 are flow charts for explaining a process flow of the preferred embodiment which has been explained in FIGS. 3A to 3C.

Figure 13:
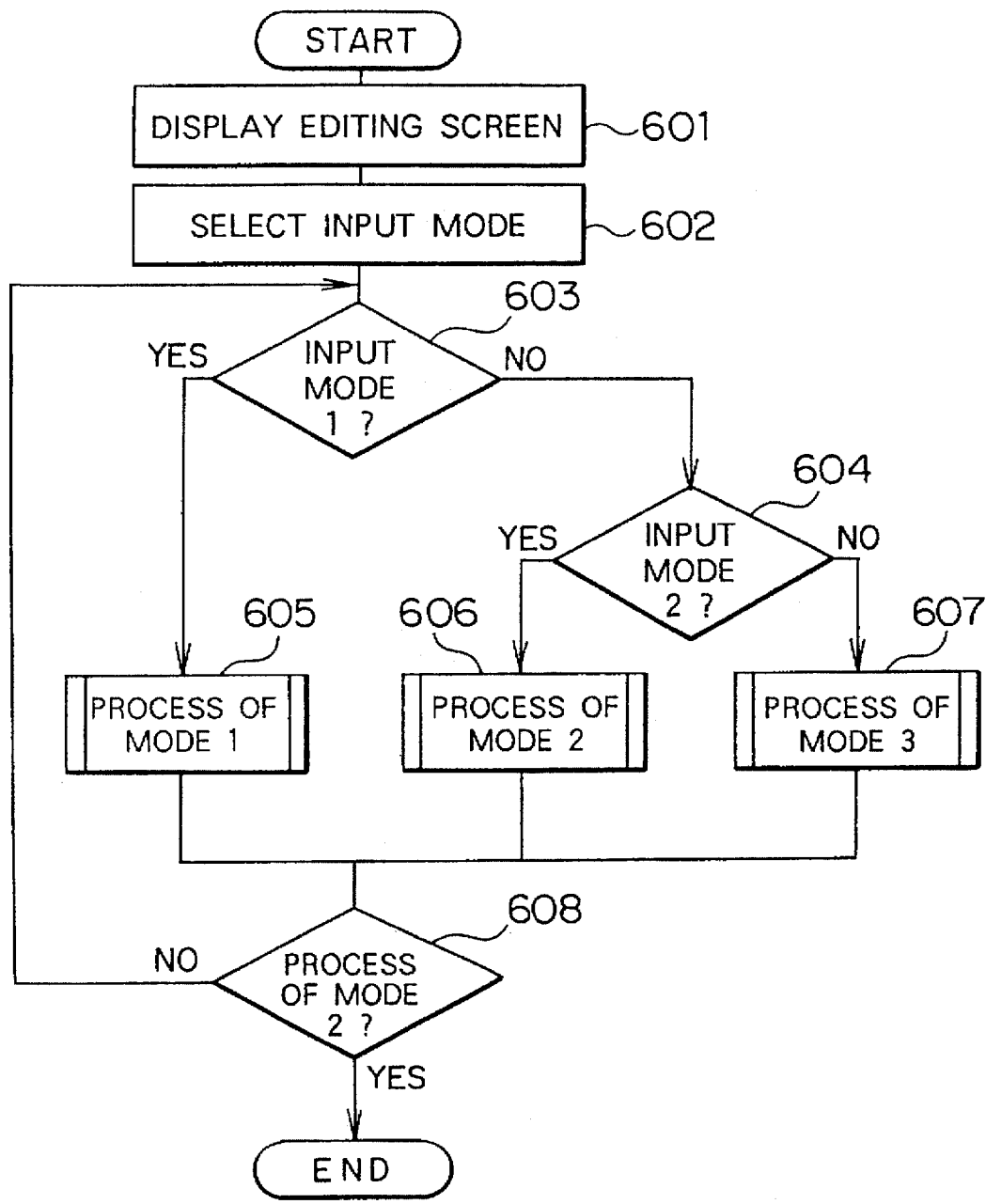
FIG. 13 is a flow chart for explaining a major process of a second preferred embodiment.

FIG. 13 represents a main process flow. When a sequence program is formed and edited, an editing screen is displayed at first (601). In case that an amendment is made in the content of the previously formed sequence program, the content is read out from the external storage apparatus and the content thereof is displayed. Next, a selection is made of a desirable input mode from the three input modes. Subsequently, a judgement is performed with respect to the selected input mode (603, 604) and then the process is advanced to the process of the selected mode (605, 606 or 607). After the process of the respective modes has been ended, another judgement is made whether or not the process shown in FIG. 13 has been accomplished (608). If the process has not yet been ended, the process is returned to a step 603.

A description will now be made of detailed flows for the processes 605 to 607 with respect to the respective modes.

Figure 14A:
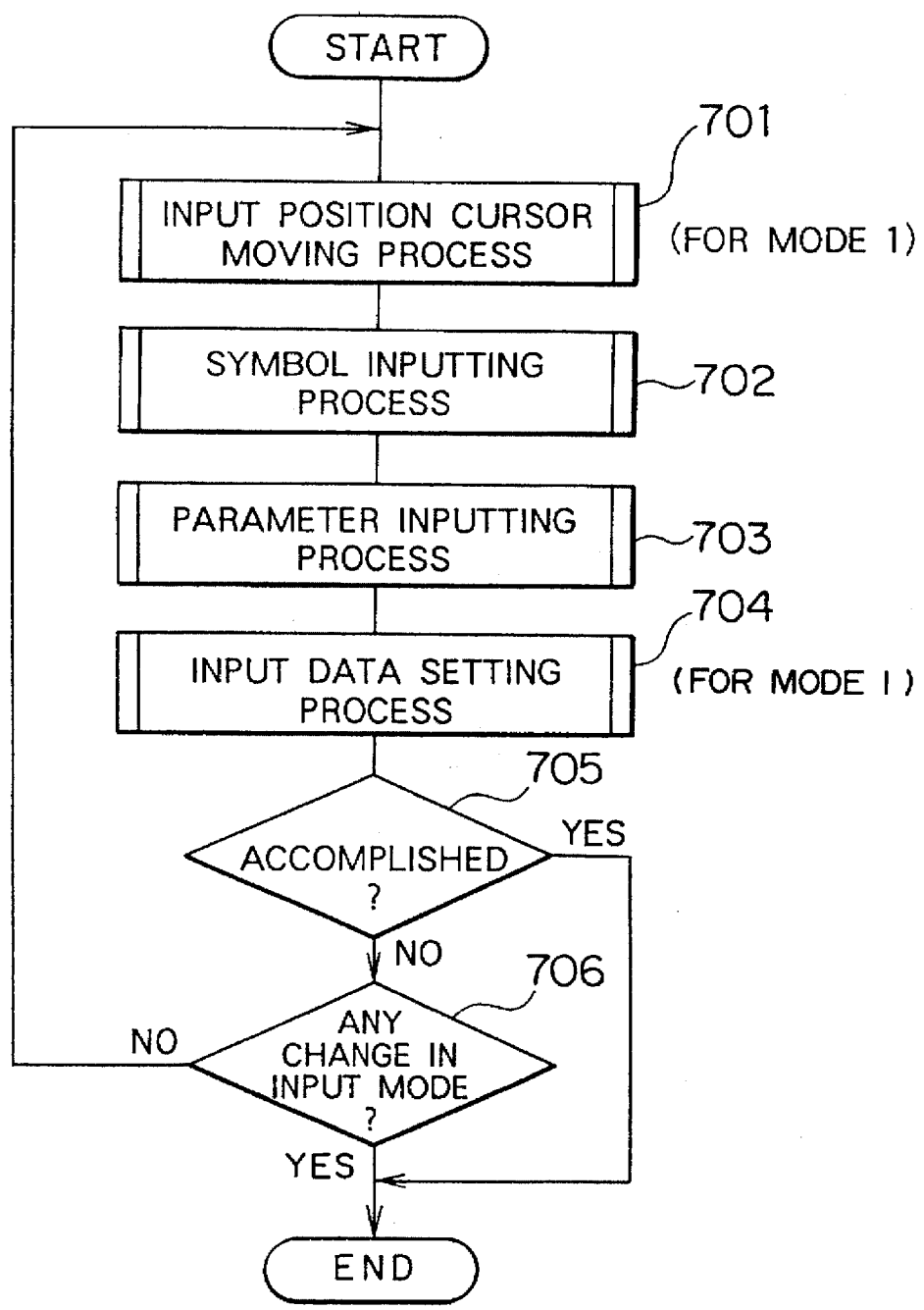

FIGS. 14A to 14E show the detailed process flow of the mode 1 and FIG. 14A represents a main process flow thereof.

In FIG. 14A, a movement process of the input position cursor 93 for the mode 1 is first performed (701). Then, a symbol input process (703) is performed, and thereafter an input data setting process (704) for the mode 1 is carried out. Subsequently, a judgement is made whether or not this process shown in this drawing is ended (705), and if this process is not ended, a check is made whether or not there is a change in the input mode (706). If no change is made, the process is returned to the process 701, whereas if the change is made, this process as defined in this figure is accomplished.

Figure 14B:
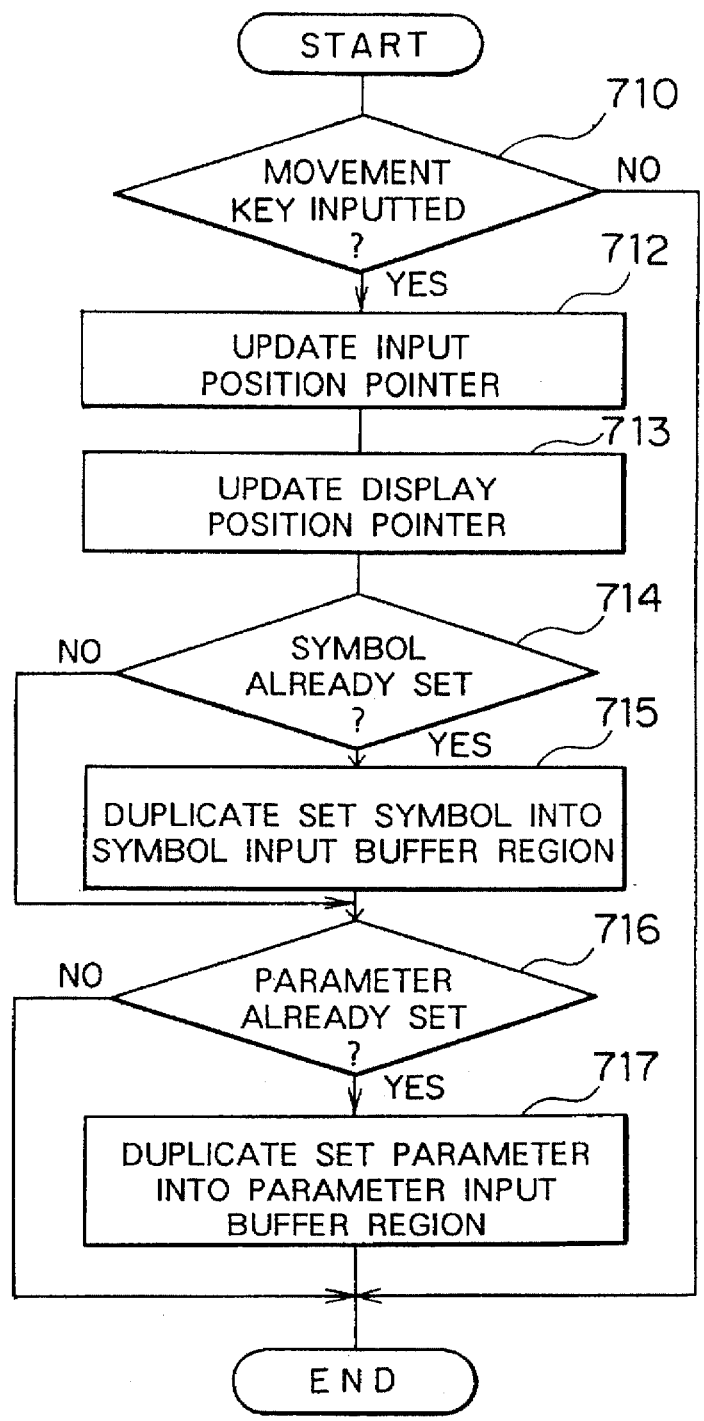

FIG. 14B represents a detailed process flow of the input position cursor moving process 701 as defined in FIG. 14A. First, a check is done whether or not the movement key (although not shown, for instance this key may be a key "→" or a key "←") of the input position cursor 9 is inputted (710), and then if no movement key is entered, the process of this drawing is ended. Conversely, if the movement key is entered, the input position pointer 124 is updated in accordance with this input (712) and the display position pointer 125 is also updated. Thus, another check is made whether or not the symbol has been previously set at this relevant position (714), and if no symbol has been set there, the process is advanced to a process 716. If the symbol has been already set at this position, then the symbol set at this position is duplicated into a symbol input buffer region 121a (715). At a subsequent process 716, a check is made whether or not the parameter has been previously set at this position, and if no parameter has been set there, this process operation of FIG. 14B is accomplished, but if the parameter has been set there, this relevant parameter is copied into the parameter input buffer region 121b.

As previously stated, when the input position cursor 93 is moved, if either the symbol or the parameter has been already set at the position where the input position cursor 93 has been moved, the content thereof is displayed at the circuit input region 96 on the display screen. If neither symbol nor parameter has been set, there is no change in the representation of the circuit input region 96. As a result, there is no risk that the erroneous correction is performed by mistakenly depressing the "return" key when the cursor is moved to the position where the symbol and the like has been set. Also, since the content presently displayed is maintained at the circuit input region 96 as to the position where no symbol has been set, no key is again inputted but a content thereof may be newly utilized for input operation.

Figure 14C:
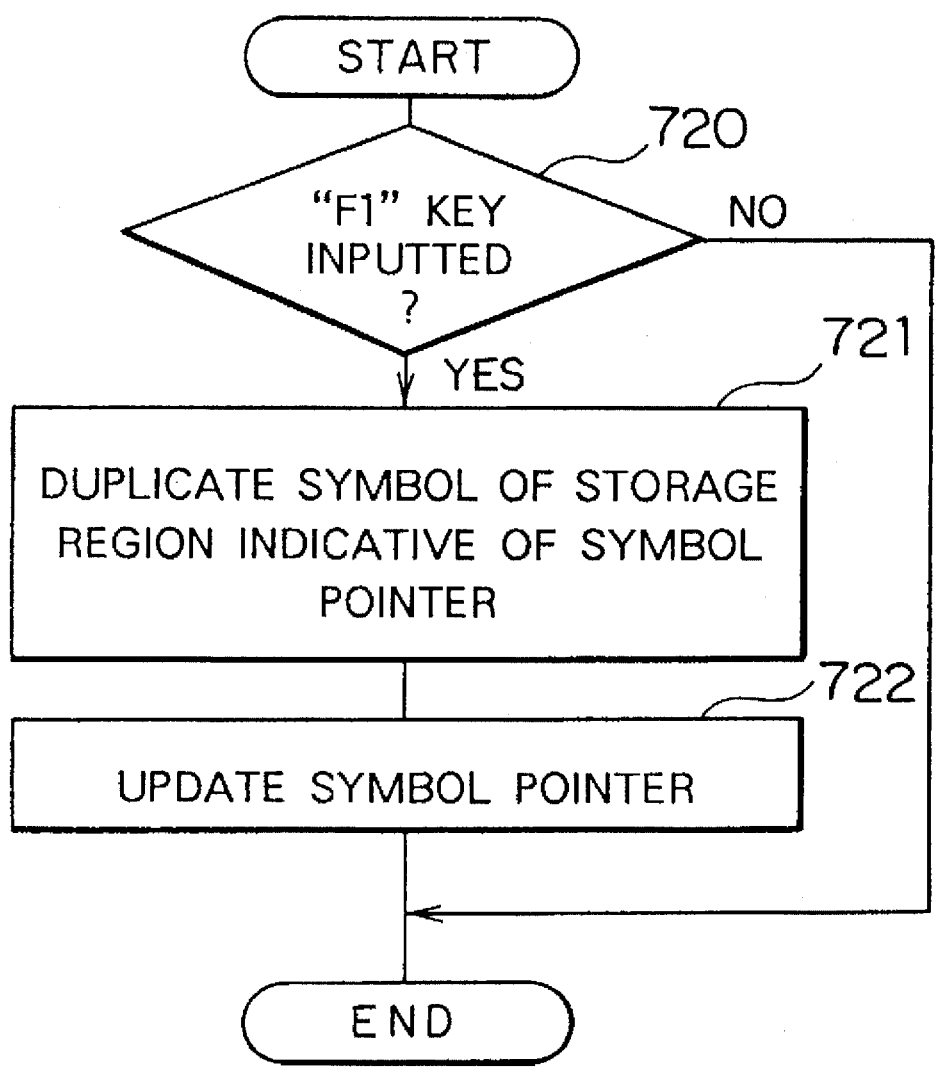

FIG. 14C represents a detailed process flow of the symbol input process 702 shown in FIG. 14A. It should be noted that this process is commonly used as in a symbol input process 801 of a mode 2 (will be discussed later). When a check is made whether or not the "F1" key is inputted (720), if the "F1" key is not inputted, this process is accomplished. However, if the "F1" key is inputted, the process is advanced to a process 721. At the process 721, the symbol within the symbol storage region 122 indicated by the present symbol pointer 123 is duplicated to the symbol input buffer region 121a. Thereafter, the symbol pointer 123 is updated (722).

FIG. 14D is a flow chart for representing a detailed operation of the parameter input process 703 shown in FIG. 14A. This process is commonly used as that of a parameter input process 901 for the mode 3 (will be discussed later). Upon depression of the "insert" key, the insertion mode of the character input is selected (730, 746). Although the movement key of the cursor 94 for the character input is not shown, a different key from the movement keys "→" and key "←" of the input position cursor 93 is employed. The moving operation of the parameter input cursor 94 can be freely performed (731, 742 to 745) within the input available range without changing the contents of the parameter input buffer region 121b. The characters positioned at the left side of the cursor may be successively erased by operating the "backward" key (732, 739 to 741). The characters may be inputted, depending upon the selection of the insert mode, while maintaining the previously inputted contents or amending these contents (733 to 738).

Figure 14E:
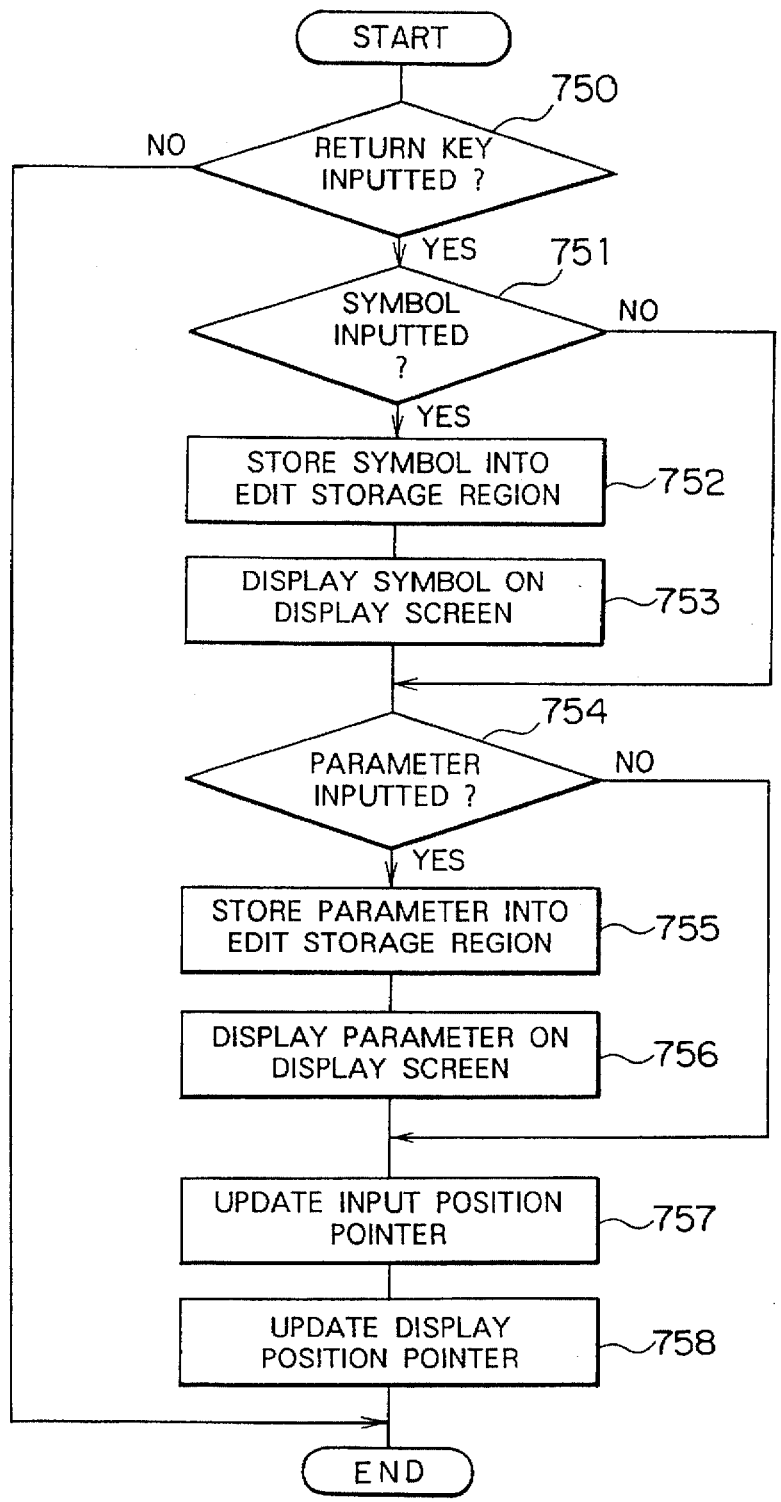

FIG. 14E represents a detailed process flow of the input data setting process 704 shown in FIG. 14A. This process corresponds to such a process that both a symbol and a parameter which have been held in the circuit input region 96 on the display screen are transferred and duplicated into the circuit display region 90. A first check is made whether or not the "return" key is inputted (750). If no return key is entered, this process is ended. Conversely, if the return key is inputted, the process is advanced to a process at 751. At this process 751, if the symbol has been displayed on the symbol input region 91 (namely, if the symbol is held at the symbol storage region 121a), this symbol is stored into the position which has been designated by the input position pointer 124 of the edition storage region 120. As a result, this symbol is displayed at a position indicated by the display position pointer 93 of the circuit display region 90 (753). Similarly, as to the parameter, the content of the parameter input region 92 is displayed on the circuit display region (755, 756). Thereafter, both the input position pointer 124 and display position pointer 125 are updated to the next position (757, 758).

Next, a description will now be made of a process flow for the mode 2 to input only the symbol.

Figure 15A:
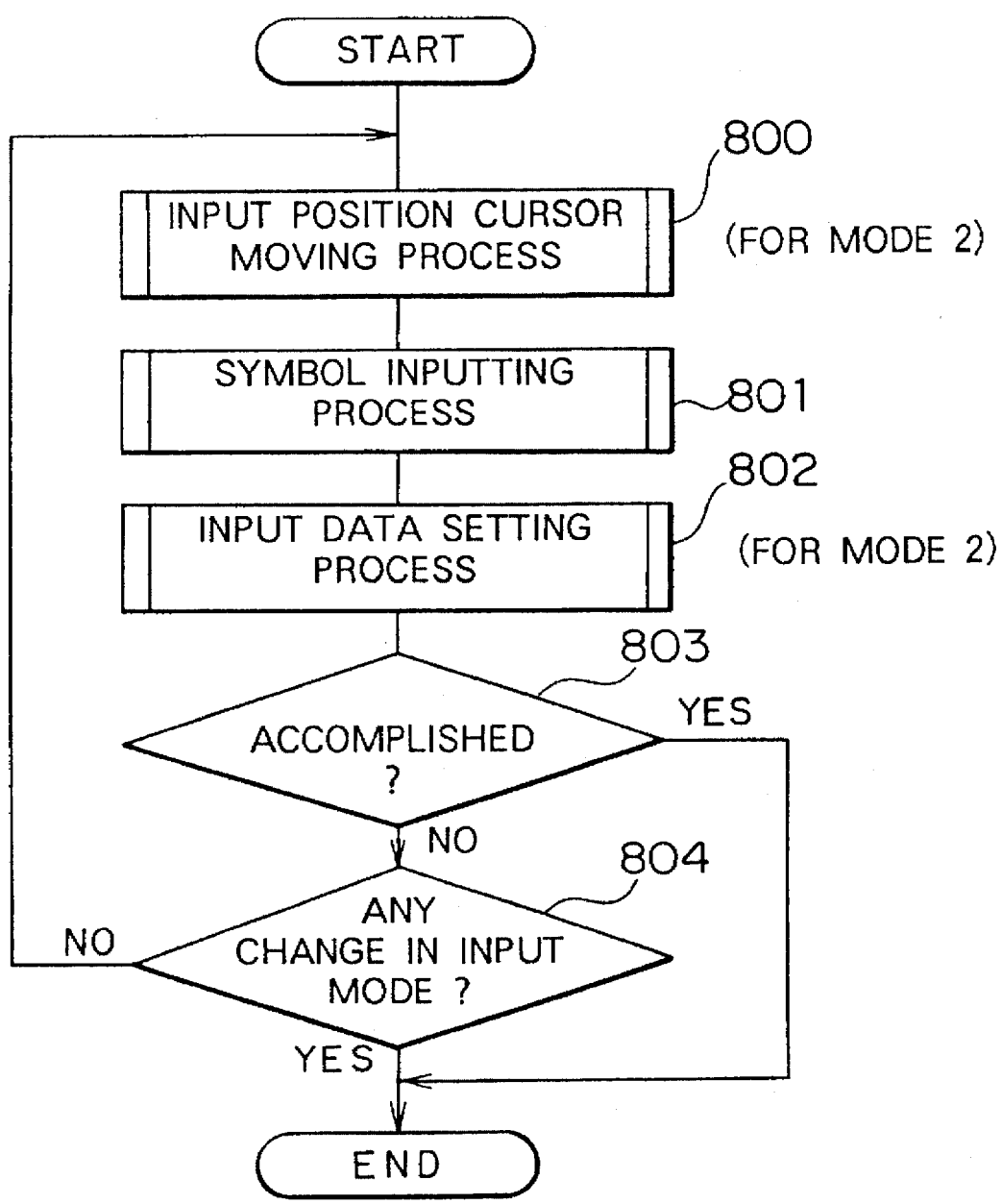

FIG. 15A represents a process flow of a main process of the mode 2. First, a process for moving the input position cursor of the mode 2 is performed (800). Thereafter, after the symbol has been inputted (801), a process for setting input data for the mode 2 is performed (802). Subsequently, a check is made whether or not this process is accomplished (803). If this process is not ended, a check is made whether or not the input mode is changed (804). If no input mode is changed, the process operation is returned to the provides process 800, whereas if the input mode is changed, this process is accomplished.

FIG. 15B represents a detailed process flow of the input position cursor moving process 800 used in the mode 2 of FIG. 15A. This process corresponds to a part of the input position cursor moving process used in the mode 1 as shown in FIG. 14B, from which the processes 716 and 717 for duplicating the previously set parameter into the parameter input region 92 have been deleted.

Figure 15C:
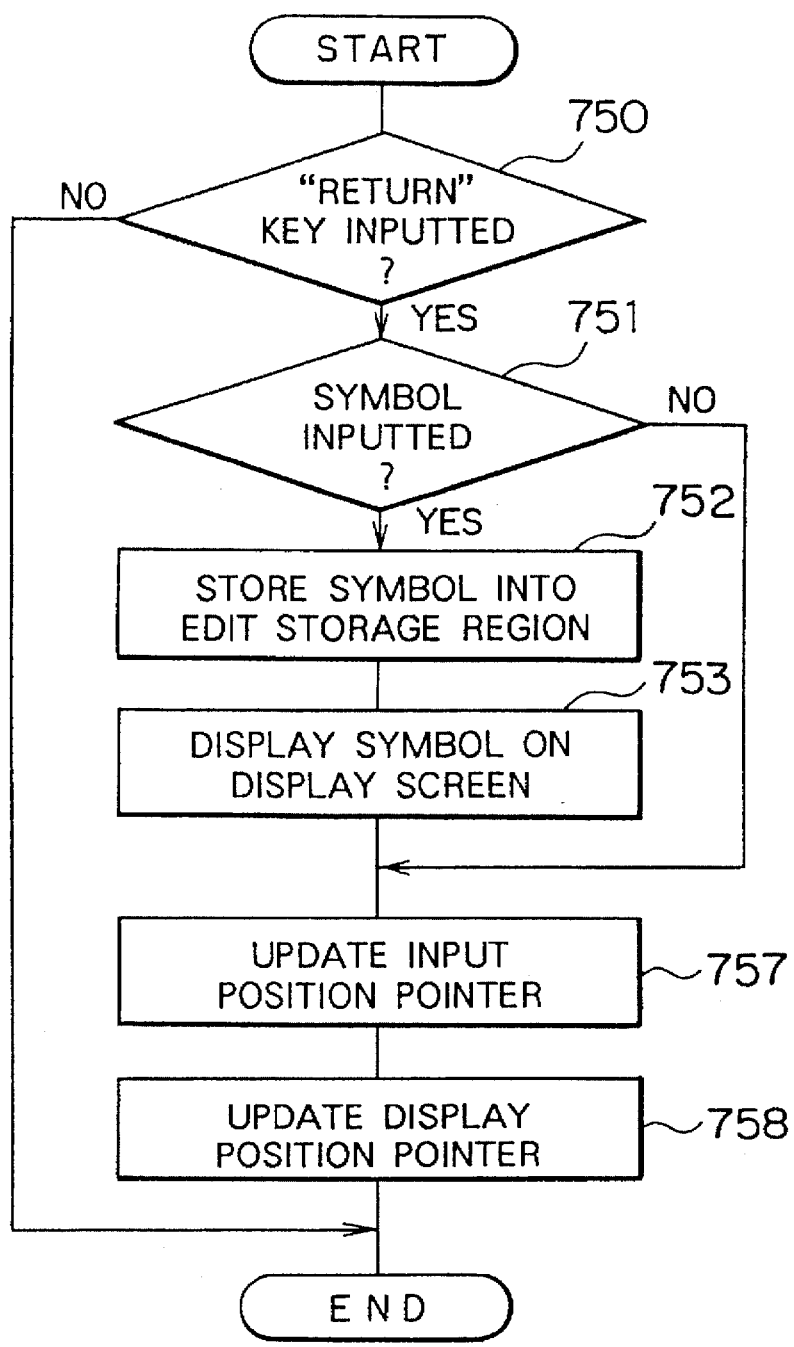

FIG. 15C indicates a detailed process flow of the input data setting process 802 used in the mode 2 shown in FIG. 15A. This process corresponds to a part of the process shown in FIG. 14E, and is the same as the last-mentioned process from which the processes 754 to 756 related to the parameter setting operation have been deleted.

Figure 16A:
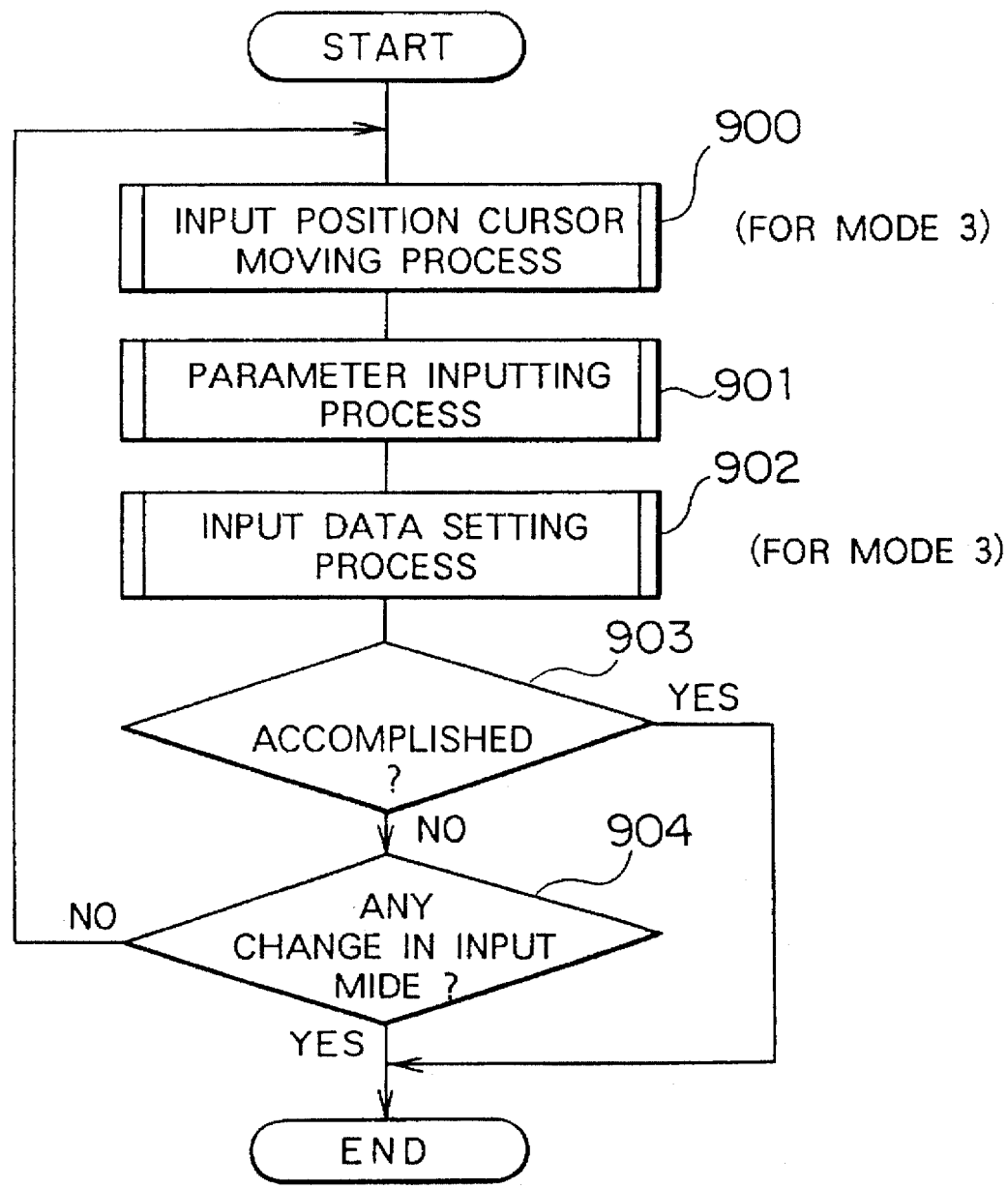
FIGS. 16A to 16C are flow charts for explaining a process of mode 3.
Figure 16B:
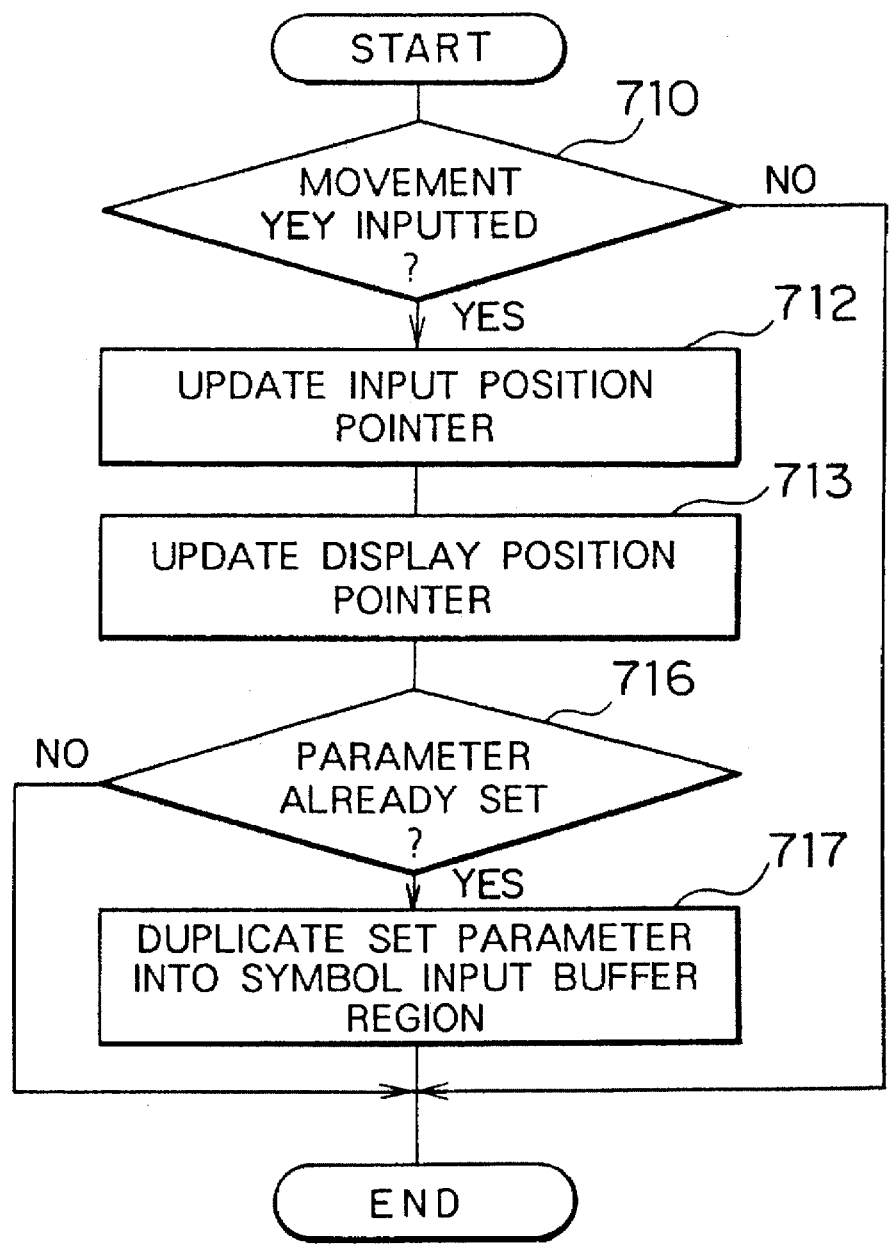
Figure 16C:
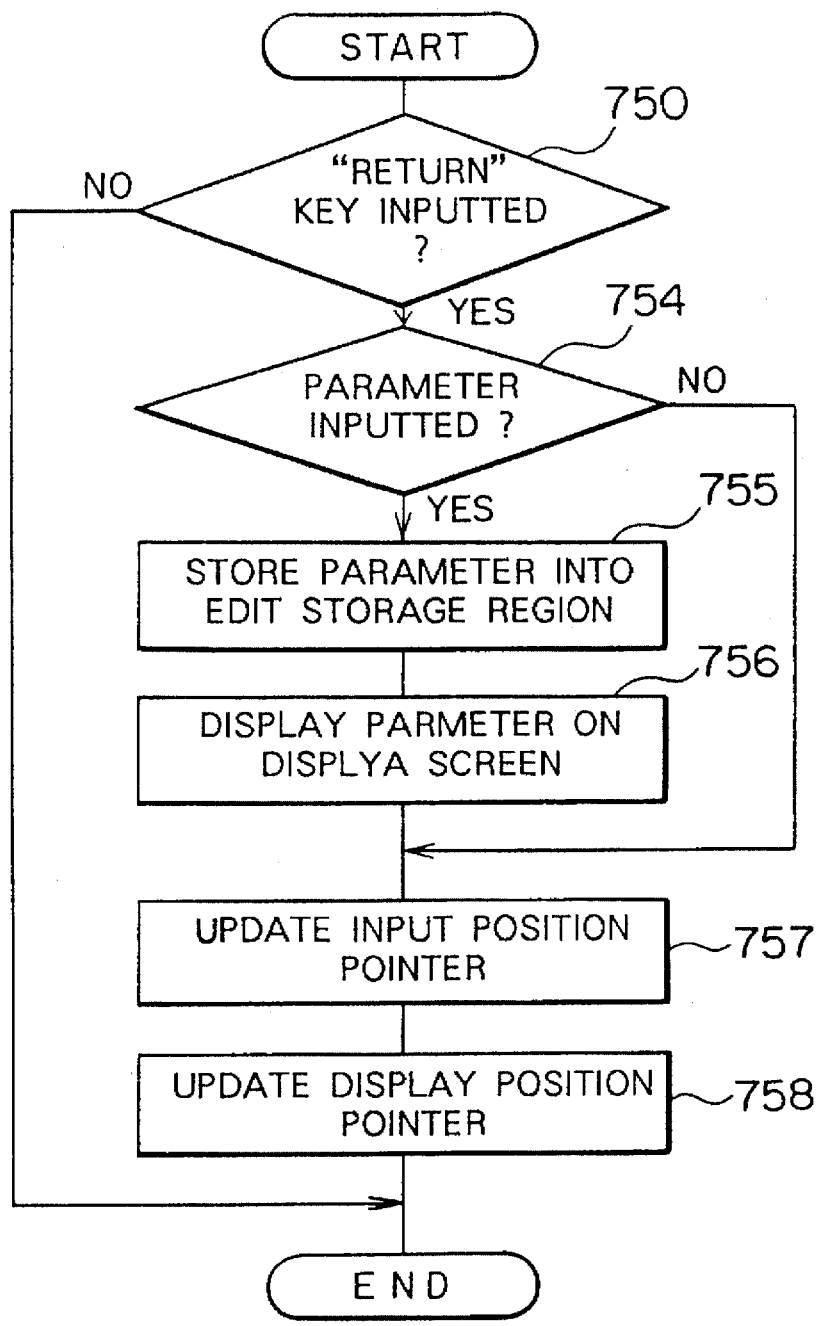

Referring now to FIGS. 16A to 16C, a description will now be made of the process flow used in the mode 3 where only the parameter is inputted.

FIG. 16A represents a process flow for a main process of the mode 3. First, an input position cursor moving process used in the mode 3 is performed (900), and thereafter an input process of the parameter is effected (901). Thereafter, an input data setting process used in the mode 3 is carried out (902). Subsequently, a check is made whether or not this process is accomplished (903). If this process is not yet ended, then another check is made whether or not the input mode is changed (904). If no input mode is changed, then the process is returned to the previous process 900. If the input mode is changed, then this process is completed.

FIG. 16B represents a detailed process flow of the input position cursor moving process 900 used in the mode 3 shown in FIG. 16A. This process corresponds to a part of the input position cursor moving process used in the mode 1 shown in FIG. 14B, and is identical to this cursor moving process other than the processes 714 and 715 for duplicating the previously set symbol into the symbol input region 11.

FIG. 16C represents a detailed process flow of the input data setting process 902 used in the mode 2 shown in Pig. 16A. This process corresponds to a part of the process shown in FIG. 14E, and is identical to the last-mentioned process other than the processes 751 to 753 related to the symbol setting operations.

In accordance with this preferred embodiment, since the key input sequence is freely set, a user can input symbols and/or parameters according to a desirable input sequence suitable for the user.

Also, since both the symbol and parameter which have been previously inputted are left in the respective symbol input region and parameter input region, these symbols and parameters can be utilized in the subsequent input operation. As a consequence, a total number of key input operation is reduced so that workloads given to the user may be reduced.

Furthermore, in case that the formed circuit is partially amended, when the input position cursor is moved to the position to be amended, both the symbol and parameter located at this amending position are inputted/displayed in the respective symbol input region and parameter input region. Then, since the amendment and change are performed with employment of these symbol and parameter, a total key input number required for amending the circuit portion may be reduced by ½ to ⅒.

While the preferred embodiments of the present invention have been explained, the present invention is not limited thereto, but may be modified and changed without departing from the technical spirit and scope of the present invention. For instance, not only the above-described various types of keys, but also other keys may be employed. Also, input devices other than the keyboard may be utilized.

We claim:

1. A programming method for programming a programmable controller using a ladder diagram, said ladder diagram including a plurality of interconnected constructive unit elements each representative of at least a circuit element and a parameter of said circuit element, wherein a data inputting portion or a data correcting portion of said ladder diagram displayed on a screen is designated by a cursor, comprising the steps of:

employing a first cursor and a second cursor to designate either the data inputting portion or the data correcting portion, said first cursor being larger than said second cursor, and a size of said first cursor being arbitrarily changeable;

equipping each of said constructive unit elements of said ladder diagram with a circuit symbol element representative of a relay circuit element and a plurality of character elements, representative of at least one parameter of said relay circuit element, at a plurality of character display positions for specifying said relay circuit element, said second cursor being displayed within said first cursor and being movable in units of a character display position;

designating a constructive unit element by said first cursor, said first cursor being movable in units of a constructive unit element, said first cursor designating said constructive unit element by designating a region on said screen surrounding said constructive unit element; and designating, by said second cursor, each character display position of said character elements for said designated element by moving said second cursor within said region on said screen designated by said first cursor, circuit symbol elements and movement directions of said second cursor being assigned to function keys, said second cursor designating a character element representative of a parameter of a relay circuit element included within the constructive unit element designated by said first cursor, said second cursor designating said character element by designating a sub-region on the screen within said region designated by said first cursor, said sub-region surrounding said character element and being positioned on the screen immediately below said circuit symbol element included in said construction unit element, said second cursor inputting and correcting the character element within the constructive unit element designated by said first cursor.

2. A programming method for a programmable controller as claimed in claim 1, wherein said region on said screen designated by the first cursor is emphatically displayed.

3. A programming method for a programmable controller as claimed in claim 2, wherein at least the character element is displayed in an enlargement mode by moving the first cursor to the previously inputted element.

4. A programming method for a programmable controller as claimed in claim 1, wherein the character element is displayed at a position different from a normal position by moving the first cursor to the previously inputted element.

5. A programming method for a programmable controller as claimed in claim 1, wherein to amend a character which has been inputted into the character element, character is designated by said second cursor and amended in unit of one character.

6. A programming method according to claim 1, wherein at least one of said constructive unit elements includes either a comparing box or a calculating box.

7. A programming apparatus for programming a programmable controller using a ladder diagram, said ladder diagram including a plurality of interconnected constructive unit elements each representative of at least a circuit element and a parameter of said circuit element, wherein either a data inputting portion or a data correcting portion of said ladder diagram displayed on a screen is designated by a cursor, comprising:

first cursor movement controlling means including a first cursor for sequentially designating a constructive unit element of said ladder program in response to a movement operation of said first cursor, said constructive unit element including at least a circuit symbol element representative of a circuit element or a character element representative of a parameter of said circuit element, a size of said first cursor being arbitrarily changeable, said first cursor designating said constructive unit element by designating a region on said screen surrounding said constructive unit element; and second cursor movement controlling means including a second cursor for sequentially designating, said character element of said constructive unit element designated by said first cursor movement controlling means in response to a movement operation of said second cursor within said region on said screen, said second cursor being smaller than said first cursor and being displayed within said first cursor and being movable in units of a character display position, said second cursor designating a character element representative of a parameter of a circuit element included within the constructive unit element designated by said first cursor, said second cursor designating said character element by designating a sub-region on the screen within said region designated by said first cursor, said sub-region surrounding said character element and being positioned on the screen immediately below said circuit symbol element included in said construction unit element, said second cursor inputting and correcting the character element within the constructive unit element designated by said first cursor, and said first cursor being movable in units of a constructive unit element, each of said constructive unit elements of said ladder diagram being constructed of a circuit symbol element indicative of a relay circuit element and a character element having a plurality of character data indicative of a parameter of said relay circuit element designated by said first cursor, the circuit symbol elements and movement directions of said second cursor being assigned to function keys.

8. A programming apparatus for a programmable controller as claimed in claim 7, further comprising:

emphasizing display means for emphatically displaying said region on said screen designated by said first cursor by way of the first cursor movement controlling means.

9. A programming apparatus for a programmable controller as claimed in claim 7, further comprising:

enlarging display means for displaying said region on said screen designated by said first cursor by way of the first cursor movement controlling means in an enlargement mode.

10. A programming apparatus for a programmable controller as claimed in claim 7, further comprising:

display means for displaying the character element of said element at a position different from a normal position in response to designation of the previously inputted element made by said first cursor.

11. A programming apparatus for a programmable controller as claimed in claim 7, further comprising:

correcting means for correcting one arbitrary character present within the character element designated by said second cursor, by the inputted character.

12. A programming method according to claim 7, wherein at least one of said constructive unit elements includes either a comparing box or a calculating box.

* * * * *